United States Patent
Glugla et al.

(10) Patent No.: US 9,657,671 B2
(45) Date of Patent: *May 23, 2017

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Garlan J. Huberts, Milford, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,515

(22) Filed: Nov. 9, 2015

(65) Prior Publication Data

US 2016/0061135 A1     Mar. 3, 2016

Related U.S. Application Data

(60) Continuation of application No. 14/715,410, filed on May 18, 2015, now Pat. No. 9,181,892, which is a (Continued)

(51) Int. Cl.
*F02D 41/00* (2006.01)
*F02D 41/14* (2006.01)
(Continued)

(52) U.S. Cl.
CPC ....... *F02D 41/1447* (2013.01); *F02D 35/027* (2013.01); *F02D 37/02* (2013.01);
(Continued)

(58) Field of Classification Search
CPC .......... F02D 2041/0067; F02D 41/005; F02D 2200/0414; F02D 41/1446
(Continued)

(56) References Cited

U.S. PATENT DOCUMENTS 4,219,250 A    8/1980   Inada et al.
4,305,352 A    12/1981   Oshima et al.
(Continued)

FOREIGN PATENT DOCUMENTS

EP      1400672 A3   10/1996
JP     404008847 A   1/1992
(Continued)

OTHER PUBLICATIONS

Partial Translation of Office Action of Chinese Application No. 201310236882.7, Issued Sep. 5, 2016, State Intellectual Property Office of PRC, 8 Pages.

*Primary Examiner* — John Kwon
(74) *Attorney, Agent, or Firm* — Julia Voutyras; McCoy Russell LLP

(57) ABSTRACT

Methods and systems are provided for reducing late burn induced cylinder pre-ignition events. Forced entry of residuals from a late burning cylinder into a neighboring cylinder may be detected based on engine block vibrations sensed in a window during an open exhaust valve of the late burning cylinder. In response to the entry of residuals, a pre-ignition mitigating action, such as fuel enrichment or deactivation, is performed in the neighboring cylinder.

20 Claims, 7 Drawing Sheets

Related U.S. Application Data division of application No. 13/539,045, filed on Jun. 29, 2012, now Pat. No. 9,043,122.

(51) Int. Cl.

| | | |
|---|---|---|
| *F02D 43/00* | (2006.01) | |
| *F02P 5/152* | (2006.01) | |
| *F02D 35/02* | (2006.01) | |
| *F02D 37/02* | (2006.01) | |
| *F02P 17/02* | (2006.01) | |
| *F02D 41/40* | (2006.01) | |
| F02D 41/30 | (2006.01) | |
| F02D 41/38 | (2006.01) | |

(52) U.S. Cl.
CPC ..... *F02D 41/0025* (2013.01); *F02D 41/0087* (2013.01); *F02D 41/1498* (2013.01); *F02D 41/30* (2013.01); *F02D 41/3005* (2013.01); *F02D 41/401* (2013.01); *F02D 43/00* (2013.01); *F02P 5/1527* (2013.01); *F02P 17/02* (2013.01); F02D 41/3094 (2013.01); F02D 2041/389 (2013.01); F02D 2200/025 (2013.01); Y02T 10/46 (2013.01)

(58) Field of Classification Search
USPC ....... 701/101, 108, 111; 123/406.11, 406.18, 123/406.21, 406.37, 406.48, 478, 480, 123/676
See application file for complete search history.

(56) References Cited

U.S. PATENT DOCUMENTS

| | | | |
|---|---|---|---|
| 4,454,718 A | 6/1984 | Sakakibara et al. | |
| 4,556,030 A | 12/1985 | Aono | |
| 4,792,902 A | 12/1988 | Hrovat et al. | |
| 5,386,367 A | 1/1995 | Ziegler et al. | |
| 5,619,968 A | 4/1997 | Hillsberg et al. | |
| 5,905,193 A | 5/1999 | Hashizume et al. | |
| 6,044,824 A | 4/2000 | Mamiya et al. | |
| 6,105,552 A | 8/2000 | Arisawa et al. | |
| 6,354,264 B1 | 3/2002 | Iwakiri et al. | |
| 6,543,419 B2 | 4/2003 | Okamoto et al. | |
| 6,561,163 B1 | 5/2003 | Takahashi et al. | |
| 6,705,277 B1 | 3/2004 | McGee | |
| 6,758,201 B2 | 7/2004 | Hosoi | |
| 6,769,625 B2 | 8/2004 | Peterson, Jr. | |
| 6,827,061 B2 | 12/2004 | Nytomt et al. | |
| 6,883,497 B2 | 4/2005 | Wozniak et al. | |
| 6,951,198 B1 | 10/2005 | Megli et al. | |
| 6,959,689 B1 | 11/2005 | Megli et al. | |
| 7,043,350 B2 | 5/2006 | Abe et al. | |
| 7,128,048 B2 | 10/2006 | Yamaoka et al. | |
| 7,178,503 B1 | 2/2007 | Brehob | |
| 7,219,650 B2 | 5/2007 | Nagano et al. | |
| 7,255,080 B1 | 8/2007 | Leone | |
| 7,275,519 B2 | 10/2007 | Miyazaki et al. | |
| 7,303,144 B2 | 12/2007 | Alyanak | |
| 7,461,633 B2 | 12/2008 | Vangraefschepe et al. | |
| 7,673,614 B2 | 3/2010 | Inada et al. | |
| 7,694,666 B2 | 4/2010 | Lewis et al. | |
| 7,721,710 B2 | 5/2010 | Leone et al. | |
| 7,921,833 B2 | 4/2011 | Bidner et al. | |
| 8,006,670 B2 | 8/2011 | Rollinger et al. | |
| 8,073,613 B2 | 12/2011 | Rollinger et al. | |
| 8,095,297 B2 | 1/2012 | Glugla et al. | |
| 8,171,912 B2 | 5/2012 | Glugla et al. | |
| 8,260,530 B2 | 9/2012 | Rollinger et al. | |
| 8,439,011 B2 | 5/2013 | Glugla et al. | |
| 8,447,502 B2 | 5/2013 | Rollinger et al. | |
| 8,997,723 B2 | 4/2015 | Glugla et al. | |
| 9,181,892 B2 * | 11/2015 | Glugla | F02D 43/00 |
| 2005/0072402 A1 | 4/2005 | Zurloye et al. | |
| 2006/0005807 A1 | 1/2006 | Megli et al. | |
| 2006/0243243 A1 | 11/2006 | Fukasawa | |
| 2007/0119425 A1 | 5/2007 | Lewis et al. | |
| 2007/0186903 A1 | 8/2007 | Zhu et al. | |
| 2007/0215069 A1 | 9/2007 | Leone | |
| 2008/0283023 A1 | 11/2008 | Lewis et al. | |
| 2009/0165458 A1 | 7/2009 | Matthews et al. | |
| 2009/0287398 A1 | 11/2009 | Saito | |
| 2009/0292446 A1 | 11/2009 | Tanaka | |
| 2009/0308146 A1 | 12/2009 | Gautrot et al. | |
| 2010/0051379 A1 | 3/2010 | Graves | |
| 2010/0094528 A1 | 4/2010 | Auclair et al. | |
| 2010/0162707 A1 | 7/2010 | Ando | |
| 2010/0185378 A1 | 7/2010 | Hillion et al. | |
| 2010/0217504 A1 | 8/2010 | Fujii et al. | |
| 2011/0202260 A1 | 8/2011 | Cunningham et al. | |
| 2011/0224882 A1 | 9/2011 | Makino et al. | |
| 2011/0265758 A1 | 11/2011 | Glugla et al. | |
| 2011/0283688 A1 | 11/2011 | Yuda | |
| 2011/0307163 A1 | 12/2011 | Kato et al. | |
| 2011/0313641 A1 | 12/2011 | Glugla et al. | |
| 2012/0035835 A1 | 2/2012 | Glugla et al. | |
| 2012/0245827 A1 | 9/2012 | Glugla et al. | |
| 2012/0271533 A1 | 10/2012 | Shishime | |
| 2013/0139786 A1 | 6/2013 | Glugla et al. | |
| 2014/0000552 A1 * | 1/2014 | Glugla | F02D 43/00 123/295 |
| 2014/0000555 A1 * | 1/2014 | Glugla | F02D 41/008 123/305 |
| 2014/0000557 A1 * | 1/2014 | Glugla | F02D 41/008 123/435 |
| 2015/0167573 A1 * | 6/2015 | Glugla | G01L 23/225 701/104 |

FOREIGN PATENT DOCUMENTS

| | | |
|---|---|---|
| JP | 2010037964 A | 2/2010 |
| JP | 2010209710 A | 9/2010 |

* cited by examiner

METHOD AND SYSTEM FOR PRE-IGNITION CONTROL

CROSS REFERENCE TO RELATED APPLICATIONS

The present application is a continuation of U.S. patent application Ser. No. 14/715,410, entitled "METHOD AND SYSTEM FOR PRE-IGNITION CONTROL," filed on May 18, 2015, which is a divisional of U.S. patent application Ser. No. 13/539,045, entitled "METHOD AND SYSTEM FOR PRE-IGNITION CONTROL," filed on Jun. 29, 2012, now U.S. Pat. No. 9,043,122, the entire contents of each of which are hereby incorporated by reference for all purposes.

FIELD

The present description relates generally to methods and systems for controlling a vehicle engine to reduce pre-ignition events.

BACKGROUND

Summary

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Late burn combustion events wherein the combustion is later than intended can also lead to pre-ignition combustion events. Specifically, the late combustion can lead to high exhaust manifold pressures and temperatures, as well as higher than intended exhaust residuals, which raises the probability of pre-ignition events.

The Applicants herein have recognized that in turbocharged engines, late burning cylinder combustion events can raise pressures in the exhaust manifold significantly. During some conditions, the elevated exhaust manifold pressures generated in a late burning cylinder can overcome the exhaust valve spring pressure and potentially open exhaust valves on adjacent cylinders. The resulting filling of a neighboring cylinder with hot exhaust residuals can lead to a pre-ignition event on the adjacent cylinder. The problem can be exacerbated in small volume exhaust manifolds that are specifically designed to reduce turbo lag in turbocharger boosted engines.

Thus in one example, some of the above issues may be at least partly addressed by a method for an engine comprising, in response to a sensed block vibration in a window during an open exhaust valve of a first cylinder undergoing a late combustion event and after exhaust valve closing of a second cylinder, performing a pre-ignition mitigating action in the second cylinder. In this way, late burn induced pre-ignition events can be better detected and appropriately mitigated.

In one example, a first cylinder may be under a late combustion event with spark timing retarded from maximum brake torque (MBT) to provide transient torque control. A controller may then assess the output of one or more knock sensors coupled to an engine block in a (first) window that is adjusted to be during an open exhaust valve event of the first cylinder. The window may be adjusted to be after exhaust valve closing and after intake valve opening of a second cylinder that could receive exhaust residuals from the first cylinder but before intake valve closing and before a spark ignition event in the second cylinder. The sensor output may be filtered in the window. For example, the sensor output may be filtered through a first band-pass filter to filter out a first range of frequencies. In response to the filtered sensor output in the first window being larger than a threshold, it may be determined that an exhaust valve of the second cylinder has been forced open due to elevated exhaust manifold pressures, and that the sensor output was indicative of the cylinder exhaust valve slamming upon return to the exhaust seat. Herein, the high exhaust manifold pressure is due to the late combustion event in the recently firing first cylinder that generates a large amount of hot exhaust residuals and the exhaust valve slamming represents the (unintended) delivery of the hot residuals into the neighboring cylinder via forced opening of the exhaust valve. Based on the identity of the recently firing cylinder, the identity of engine cylinders that have their exhaust valves at a base circle of an exhaust camshaft, and a timing of the knock sensor output, the second cylinder receiving the hot residuals from the late burn event may be identified. An engine controller may then perform a pre-ignition mitigating action in the affected cylinder. For example, the controller may disable fuel injection or enrich fuel injection to the second cylinder receiving the hot residuals so as to reduce a temperature of the hot residuals, in situ, and thereby reduce a likelihood of late-burn induced pre-ignition.

It will be appreciated that the controller may also use the same knock sensors to identify cylinder knock and pre-ignition events in other cylinders. For example, by filtering the sensor output through a second, different band-pass filter to filter out a second, different range of frequencies, and by assessing the filtered sensor output in a second, earlier window, the controller may determine if knock or pre-ignition has occurred in a third cylinder firing immediately after the first cylinder.

In this way, vibrations detected during an open exhaust valve of a late combusting cylinder can be used to detect elevated exhaust manifold pressures and forced entry of residuals into a neighboring cylinder. By performing a pre-ignition mitigating action in the affected cylinder, a temperature of the received charge can be rapidly cooled to reduce abnormal cylinder combustion events. By improving detection of unintended exhaust valve opening and receipt of hot residuals, mitigating actions can be performed in a timely manner and engine degradation due to late burn induced pre-ignition events can be reduced. In addition, the sensed vibrations can be used to detect cylinder knock and pre-ignition events in firing cylinders. By using the same knock sensors to detect and distinguish cylinder knock, pre-ignition, and forced exhaust residual entry, component and cost reduction benefits are achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for detecting delivery of hot residuals in a cylinder responsive to late combustion in a neighboring cylinder and adjusting of a fuel injection to the affected cylinder so as to reduce late burn inducted pre-ignition events. In engines configured with small exhaust manifolds, such as the engine systems of FIGS. 1-2, exhaust residuals from a late combustion event in a first cylinder can raise exhaust manifold pressures such that the residuals are forcibly received in a second, neighboring cylinder. An engine controller may be configured to perform a control routine, such as the routine of FIG. 3, to adjust a fuel injection to the second cylinder (e.g., deactivate, or enrich the fuel injection) if the combustion timing of combustion in the first cylinder is beyond a threshold timing wherein a large amount of hot exhaust residuals might be released from the first cylinder into the exhaust manifold and potentially forcibly received in the second cylinder. Example fuel injection adjustments are described with reference to FIGS. 6-7. The controller may be further configured to perform a control routine, such as the routine of FIG. 4, to detect the forced opening of a cylinder exhaust valve based on engine block vibrations sensed in a window during an open exhaust valve event of the late combusting cylinder. An example detection is shown at FIG. 5. In this way, an exhaust valve event occurring outside of a cylinder's intake and exhaust stroke can be used to identify delivery of exhaust residuals to a cylinder from a late combustion event in a neighboring cylinder. By adjusting fuel injection to the cylinder receiving hot residuals, a temperature of the residuals may be decreased and a likelihood of late burn induced pre-ignition may be reduced.

Figure 1:
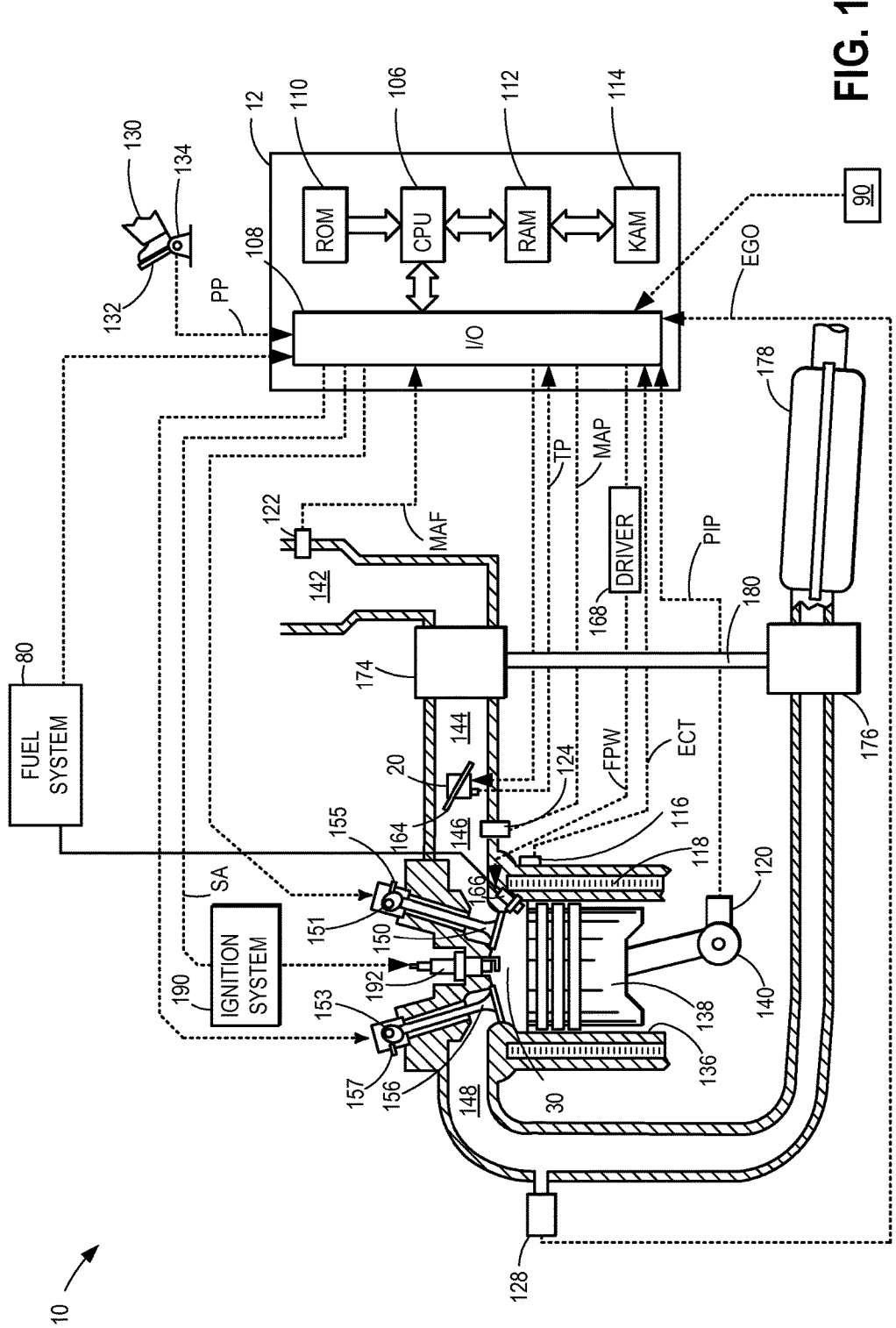
FIG. 1 shows a schematic diagram of an internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e. cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. In one example, exhaust passage 148 may receive exhaust from all the cylinders of engine 10. However, in some embodiments, as elaborated at FIG. 2, the exhaust from one or more cylinders may be routed to a first exhaust passage, while the exhaust from one or more other (remaining) cylinders may be routed to a second, different exhaust passage, the distinct exhaust passages then converging further downstream, at or beyond an exhaust emission control device. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. It will be appreciated that, in an alternate embodiment, injector 166 may be a port injector providing fuel into the intake port upstream of cylinder 30.

It will be appreciated that in still further embodiments, the engine may be operated by injecting a variable fuel blend or knock/pre-ignition suppressing fluid via two injectors (a direct injector 166 and a port injector) and varying a relative amount of injection from each injector.

Fuel may be delivered to fuel injector 166 via a high pressure fuel system 80, including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector(s) to the cylinder during a single engine cycle of the cylinder. Further, the distribution and/or relative amount of fuel delivered from the injector(s) may vary with operating conditions. For example, the distribution may vary with a rate of change of a cylinder aircharge, a nature of an abnormal cylinder combustion event (such as, whether there is a cylinder misfire event, knock event, or pre-ignition event). Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel or knock/pre-ignition suppressing fluids with different qualities, such as different compositions. These differences may include different alcohol content, different water content, different octane, different heat of vaporizations, different fuel blends, and/or combinations thereof etc. In one example, fuels or knock/pre-ignition suppressing fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. In yet another example, one of the fluids may include water while the other fluid is gasoline or an alcohol blend. Additionally, the first and second fuels may also differ in other fuel qualities such as a difference in temperature, viscosity, octane number, latent enthalpy of vaporization etc. Still other pre-ignition suppressing fluids may include water, methanol, washer fluid (which is a mixture of approximately 60% water and 40% methanol), etc.

Moreover, fuel characteristics of the fuel or pre-ignition suppressing fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Engine 10 may further include one (as depicted) or more knock sensors 90 distributed along a body of the engine (e.g., along an engine block). When included, the plurality of knock sensors may be distributed symmetrically or asymmetrically along the engine block. Knock sensor 90 may be an accelerometer, an ionization sensor, or a vibration sensor.

Figure 4:
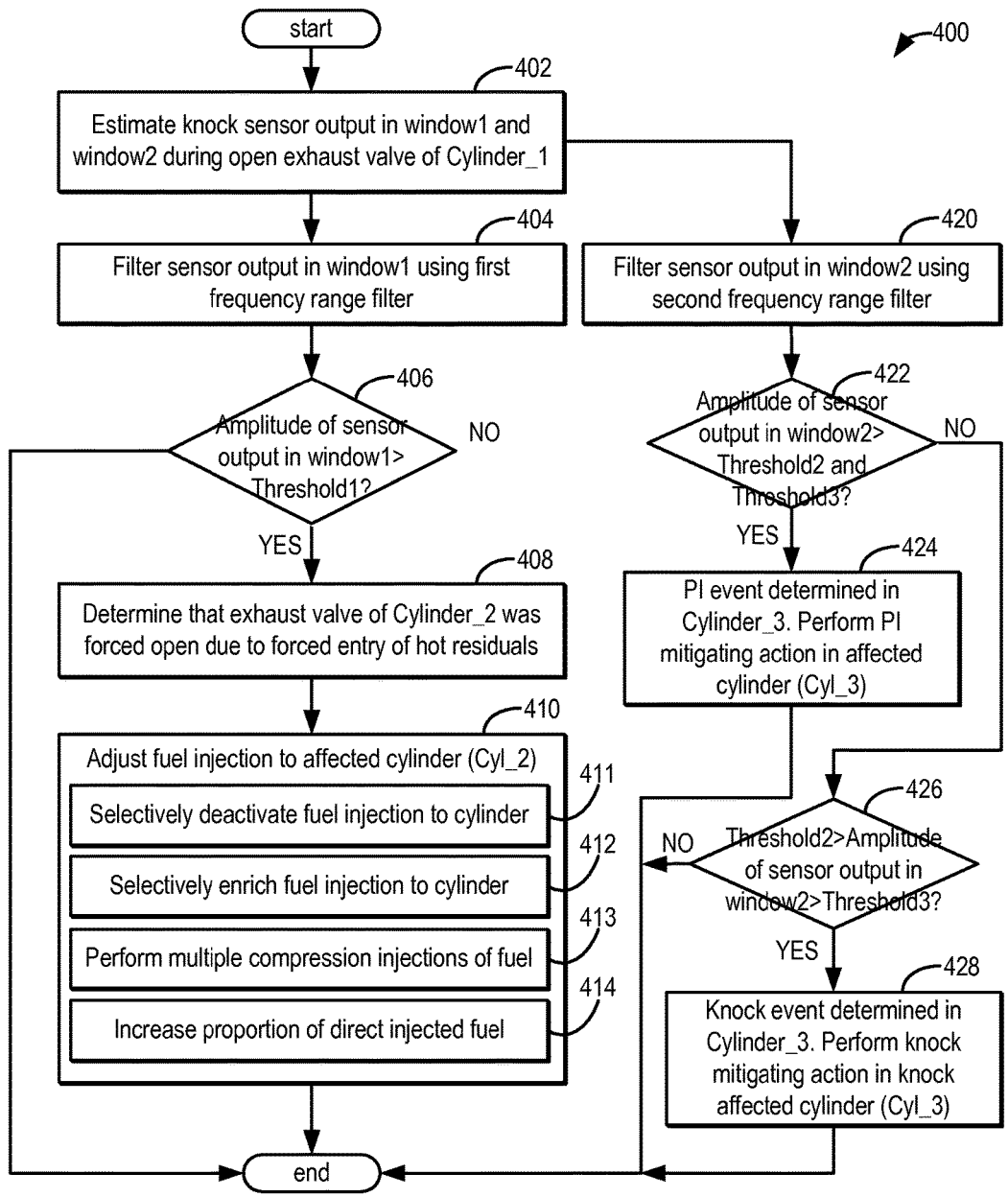
FIG. 4 shows a high level flow chart for detecting an unintended opening of a cylinder exhaust valve.
Figure 5:
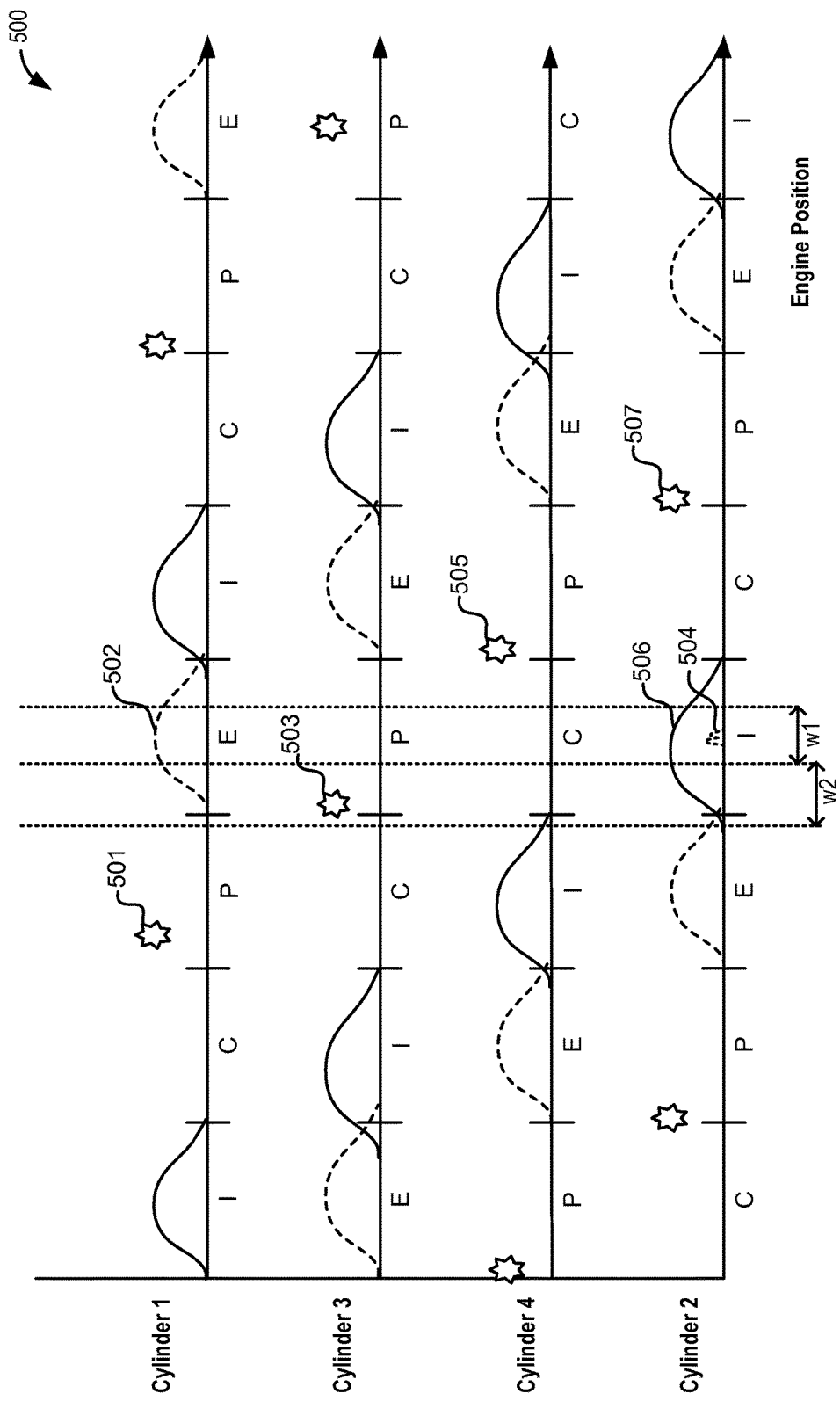
FIG. 5 shows an example detection of exhaust valve ringing responsive to forced entry of residuals generated during late combustion event in a first cylinder being received in a second cylinder.

In one example, as elaborated with reference to FIG. 4, an engine controller may be configured to detect and differentiate engine block vibrations generated due to abnormal combustion events, such as knocking and pre-ignition, from the forced opening (and subsequent slamming shut) of a cylinder exhaust valve based on the output (e.g., signal timing, amplitude, intensity, frequency, etc.) of the one or more knock sensors 90. The controller may assess the sensor outputs in different timing windows that are cylinder specific and that are based on the nature of the vibration being detected. For example, vibrations generated due to the forced opening of a cylinder exhaust valve by exhaust residuals released from a late burning cylinder may be identified by knock sensor outputs sensed in a window that is relatively later during an open exhaust valve event of the late burning cylinder. In comparison, abnormal cylinder combustion events occurring in a firing cylinder may be identified by knock sensor outputs sensed in a window that is relatively earlier during an open exhaust valve event of the late burning cylinder. In one example, the windows in which the knock signals are estimated may be crank angle windows.

In further examples, the engine controller may be configured to detect and differentiate the origin of the vibrations based on the output (e.g., signal timing, amplitude, intensity, frequency, etc.) of the one or more knock sensors as well as a rate of change of a parameter indicative of a cylinder aircharge such as a rate of change of a manifold pressure (MAP), a manifold air flow (MAF), etc.

Mitigating actions taken by the engine controller to address knock may differ from those taken by the controller to address pre-ignition. For example, knock may be addressed using ignition spark timing adjustments (e.g., spark retard) and EGR, while pre-ignition may be addressed using load-limiting, fuel enrichment, fuel enleanment, direct injection of a higher octane fuel or a knock-suppressing fluid, multiple compression stroke fuel injections, etc. In addition, pre-ignition mitigating actions taken by the controller to address incipient pre-ignition in a recently firing cylinder may differ from pre-ignition mitigating actions taken by the controller to address potential late-burn induced pre-ignition that may occur in a cylinder forcibly receiving hot exhaust residuals from a late burning cylinder. For example, incipient pre-ignition may be addressed by enriching the affected cylinder for a longer duration (e.g., a larger number of combustion events) while potential late burn induced pre-ignition may be addressed by enriching the affected cylinder for a shorter duration (e.g., a smaller number of combustion events) until a temperature of the exhaust residuals is reduced. During conditions where the pre-ignition mitigating action is responsive to a cylinder late burn event, the adjustments may also be based on an amount of delay in the late combusting cylinder.

In still further embodiments, the fuel injection (e.g., the timing of the injection, the number of injections in a given engine cycle, the amount/proportion of the fluid injected during an intake stroke relative to a compression stroke, the amount/proportion of fluid direct injected into the cylinder relative to an amount port injected into the cylinder, etc.) may be adjusted based on the detected vibration.

It will be appreciated that while FIG. 1 suggests using knock sensors to sense engine block vibrations and forced entry of exhaust residuals into a cylinder, in alternate examples, other accelerometers, vibrations sensors, or in-cylinder pressure sensors can be used to sense the vibrations.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Still other sensors such as cylinder pressure sensors, knock sensors, and/or pre-ignition sensors may be coupled to engine 10 (e.g., to a body of the engine) to help in the identification of abnormal combustion events.

Storage medium read-only memory 110 can be programmed with computer readable data representing instructions executable by processor 106 for performing the methods described below as well as other variants that are anticipated but not specifically listed.

Figure 2:
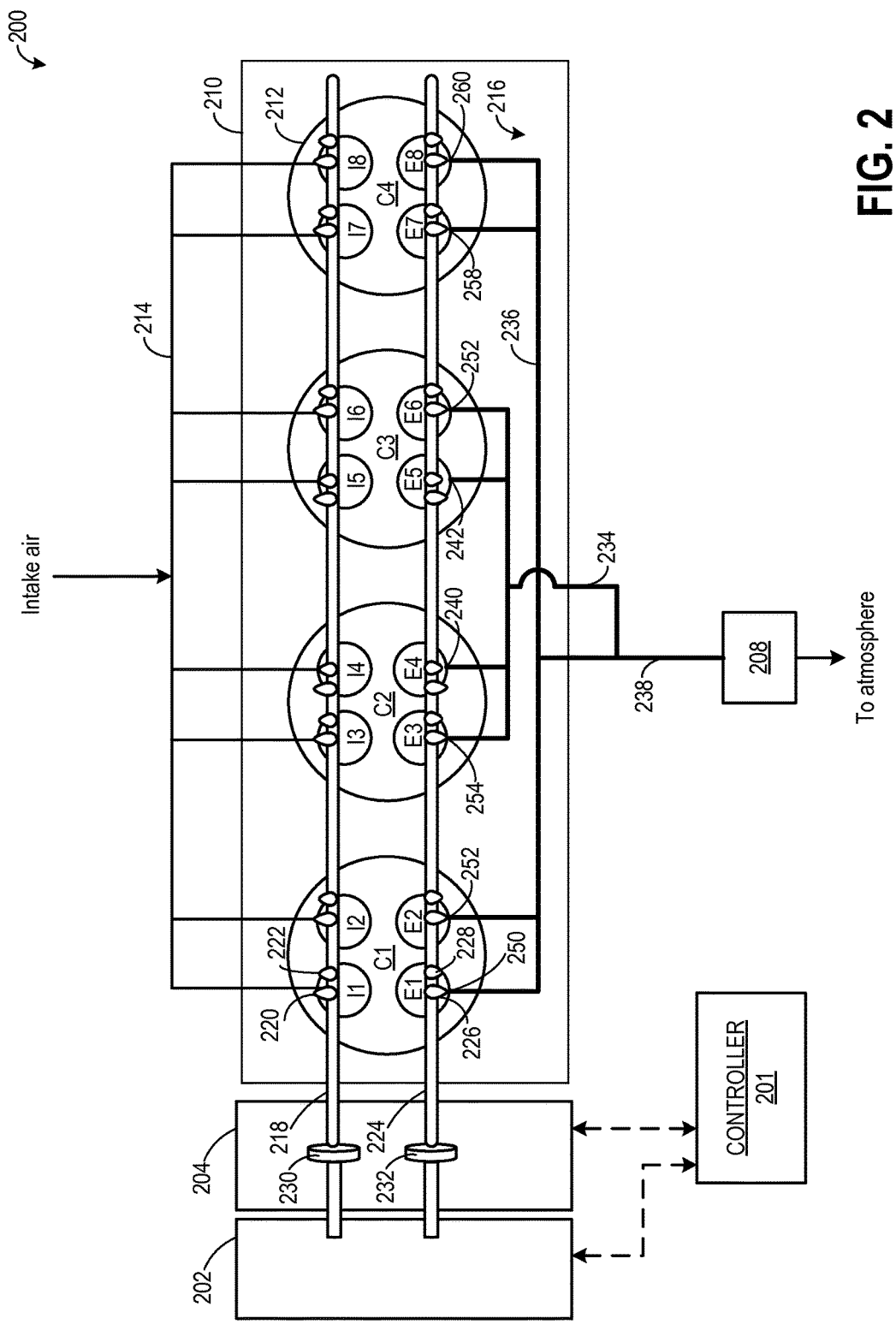
FIG. 2 shows an alternate embodiment of the engine of FIG. 1.

FIG. 2 shows an example embodiment of an engine 200, which may be engine 10 of FIG. 1, wherein exhaust from different groups of cylinders are directed to different exhaust passages of a segmented exhaust manifold. The different exhaust passages may merge at a downstream location of the exhaust manifold, at or around an emission control device.

Engine 200 includes a variable cam timing (VCT) system 202, a cam profile switching (CPS) system 204, an emission control device 208 including an exhaust catalyst, and a cylinder head 210 with a plurality of cylinders 212 (in the depicted example, four cylinder C1-C4 are illustrated). Intake manifold 214 is configured to supply intake air and/or fuel to the cylinders 212 and a segmented integrated exhaust manifold 216 is configured to exhaust the combustion products from the cylinders 212. Segmented exhaust manifold 216 may include a plurality of exhaust passages, or outlets, each coupled to the emission control device at different locations along segmented exhaust manifold 216. In a further embodiment, the different outlets may be coupled to different exhaust components. While the depicted embodiment shows intake manifold 214 being separate from cylinder head 210 and exhaust manifold 216 being integrated in cylinder head 210, in other embodiments, intake manifold 214 may be integrated and/or exhaust manifold 216 may be separate from cylinder head 210.

Cylinder head 210 includes four cylinders, labeled C1-C4. Cylinders 212 may each include a spark plug and a fuel injector for delivering fuel directly to the combustion chamber, as described above in FIG. 1. However, in alternate embodiments, each cylinder may not include a spark plug and/or direct fuel injector. Cylinders may each be serviced by one or more valves. In the present example, cylinders 212 each include two intake valves and two exhaust valves. Each intake and exhaust valve is configured to open and close an intake port and exhaust port, respectively. The intake valves are labeled I1-I8 and the exhaust valves are labeled E1-E8. Cylinder C1 includes intake valves I1 and I2 and exhaust valves E1 and E2; cylinder C2 includes intake valves I3 and I4 and exhaust valves E3 and E4; cylinder C3 includes intake valves I5 and I6 and exhaust valves E5 and E6; and cylinder C4 includes intake valves I7 and I8 and exhaust valves E7 and E8. Each exhaust port of each cylinder may be of equal diameter. However, in some embodiments, some of the exhaust ports may be of different diameter. For example, the exhaust ports controlled by exhaust valves E4 and E5 may be of smaller diameter than the remaining exhaust ports.

Each intake valve is actuatable between an open position allowing intake air into a respective cylinder and a closed position substantially blocking intake air from the respective cylinder. Further, FIG. 2 shows how intake valves I1-I8 may be actuated by a common intake camshaft 218. Intake camshaft 218 includes a plurality of intake cams configured to control the opening and closing of the intake valves. Each intake valve may be controlled by first intake cams 220 and second intake cams 222. Further, in some embodiments, one or more additional intake cams may be included to control the intake valves. In the present example, first intake cams 220 have a first cam lobe profile for opening the intake valves for a first intake duration while second intake cams 222 have a second cam lobe profile for opening the intake valve for a second intake duration. The second intake duration may be a shorter intake duration (shorter than the first intake duration), the second intake duration may be a longer intake duration (longer than the first duration), or the first and second duration may be equal. Additionally, intake camshaft 218 may include one or more null cam lobes. Null cam lobes may be configured to maintain respective intake valves in the closed position.

Likewise, each exhaust valve is actuatable between an open position allowing exhaust gas out of a respective cylinder of the cylinders 212 and a closed position substantially retaining gas within the respective cylinder. Further, FIG. 2 shows how exhaust valves E1-E8 may be actuated by a common exhaust camshaft 224. Exhaust camshaft 224 includes a plurality of exhaust cams configured to control the opening and closing of the exhaust valves. Each exhaust valve may be controlled by first exhaust cams 226 and second exhaust cams 228. Further, in some embodiments, one or more additional exhaust cams may be included to control the exhaust valves. In the present example, first exhaust cams 226 have a first cam lobe profile for opening the exhaust valves for a first exhaust duration while second exhaust cams 228 have a second cam lobe profile for opening the exhaust valve for a second exhaust duration. The second exhaust duration may be a shorter, longer, or equal to the first exhaust duration. Additionally, exhaust camshaft 224 may include one or more null cam lobes configured to maintain respective exhaust valves in the closed position.

Additional elements not shown may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 212 may each have only one exhaust valve and/or intake valve, or more than two intake and/or exhaust valves. In still other examples, exhaust valves and intake valves may be actuated by a common camshaft. However, in an alternate embodiment, at least one of the intake valves and/or exhaust valves may be actuated by its own independent camshaft or other device.

A subset of the exhaust valves of cylinders 212 may be deactivated, if desired, via one or more mechanisms. For example, exhaust valves E3-E6, which are coupled to exhaust manifold segment 234 (explained in more detail below) may be deactivated via switching tappets, switching rocker arms, or switching roller finger followers. During modes where variable displacement engine operation (VDE) is activated, the intake valves may be deactivated utilizing similar mechanisms. Alternatively, the cylinders may be configured with selectively deactivatable fuel injectors wherein the fuel injectors are selectively deactivated (while maintaining intake and exhaust valve timing) during VDE mode of operation to provide cylinder deactivation.

Engine 200 may include variable valve actuation systems, for example CPS system 204, and variable cam timing VCT system 202. A variable valve actuation system may be configured to operate in multiple operating modes based on engine operating conditions, such as based on whether the engine is performing an cold engine start, a warmed-up engine operation, engine speed-load conditions, etc. Based on the mode of operation, the variable valve actuation system may be configured to open only a subset of exhaust ports of a subset of cylinders, with all other exhaust ports closed. Additionally, the variable valve actuation system may be configured to selectively open and close the intake ports in correspondence to the opening and closing of the exhaust ports during the various operating modes.

CPS system 204 may be configured to translate specific portions of intake camshaft 218 longitudinally, thereby causing operation of intake valves I1-I8 to vary between first intake cams 220 and second intake cams 222 and/or other intake cams. Further, CPS system 204 may be configured to translate specific portions of exhaust camshaft 224 longitudinally, thereby causing operation of exhaust valves E1-E8 to vary between first exhaust cams 226 and second exhaust cams 228 and/or other exhaust cams. In this way, CPS system 204 may switch between multiple profiles. In doing so, the CPS system 204 may switch between a first cam, for opening a valve for a first duration, a second cam, for opening the valve for a second duration, and/or additional or null cams. CPS system 204 may be controlled via signal lines by controller 201 (controller 201 is one non-limiting example of controller 12 of FIG. 1).

The configuration of cams described above may be used to provide control of the amount and timing of air supplied to, and exhausted from, the cylinders 212. However, other configurations may be used to enable CPS system 204 to switch valve control between two or more cams. For example, a switchable tappet or rocker arm may be used for varying valve control between two or more cams.

Engine 200 may further include VCT system 202. VCT system 202 may be a twin independent variable camshaft timing system, for changing intake valve timing and exhaust valve timing independently of each other. VCT system 202 includes intake camshaft phaser 230 and exhaust camshaft phaser 232 for changing valve timing. VCT system 202 may be configured to advance or retard valve timing by advancing or retarding cam timing (an example engine operating parameter) and may be controlled via signal lines by controller 201. VCT system 202 may be configured to vary the timing of valve opening and closing events by varying the relationship between the crankshaft position and the camshaft position. For example, VCT system 202 may be configured to rotate intake camshaft 218 and/or exhaust camshaft 224 independently of the crankshaft to cause the valve timing to be advanced or retarded. In some embodiments, VCT system 202 may be a cam torque actuated device configured to rapidly vary the cam timing. In some embodiments, valve timing such as intake valve closing (IVC) and exhaust valve closing (EVC) may be varied by a continuously variable valve lift (CVVL) device. The valve/cam control devices and systems described above may be hydraulically powered, or electrically actuated, or combinations thereof. Signal lines can send control signals to and receive a cam timing and/or cam selection measurement from CPS system 204 and VCT system 202.

Returning to exhaust manifold 216, it may be configured with multiple outlets to selectively direct exhaust gas from different groups of cylinders to different locations along the exhaust manifold (e.g., to various exhaust components).

While the depicted example shows exhaust manifold 216 to be a single, integrated exhaust manifold that includes multiple outlets, in other embodiments, cylinder head 210 may include multiple separate and physically distinct exhaust manifolds, each having one outlet. Furthermore, the separate exhaust manifolds may be included in a common casting in cylinder head 210. In the embodiment of FIG. 2, exhaust manifold 216 includes a first exhaust manifold segment 234 and a second exhaust manifold segment 236 coupled to a common exhaust passage 238.

First exhaust manifold segment 234 couples a subset of exhaust ports of a subset of the cylinders to the emission control device 208. As shown in FIG. 2, the exhaust ports of exhaust valves E3-E6 of cylinders C2 and C3, respectively, are coupled to the first exhaust manifold segment 234. First exhaust manifold segment 234 includes inlets 240, 254 coupled to the exhaust ports controlled by exhaust valves E3 and E4, respectively and inlets 242, 256 coupled to the exhaust ports controlled by exhaust valves E5 and E6, respectively. Further, exhaust from first exhaust manifold segment 234 is directed into exhaust passage 238 upstream of emission control device 208. Thus, when exhaust valves E3-E6 are opened, exhaust is directed from cylinders C2 and C3 to the exhaust passage 238 through the first exhaust manifold segment 234 on to emission control device 208.

Second exhaust manifold segment 236 couples a different subset of the cylinders to the exhaust passage 238. As shown in FIG. 2, the exhaust ports of exhaust valves E1-E2, and E7-E8 of cylinders C1 and C4, respectively, are coupled to second exhaust manifold segment 236. Second exhaust manifold segment 236 includes inlets 250, 252 coupled to the exhaust ports controlled by exhaust valves E1 and E2, respectively and inlets 258, 260 coupled to the exhaust ports controlled by exhaust valves E7 and E8, respectively. Further, exhaust from second exhaust manifold segment 236 is directed into exhaust passage 238 upstream of emission control device 208, and upstream of a point where first exhaust manifold 234 merges with exhaust passage 238. Thus, when exhaust valves E1-E2 and E7-E8 are opened, exhaust is directed from cylinders C1 and C4 to the exhaust passage 238 through the second exhaust manifold segment 236 on to emission control device 208.

In some embodiments, the first and second exhaust manifold segments may be coupled to different exhaust components. For example, one of the exhaust manifold segments may be coupled upstream of an exhaust turbine while the other exhaust manifold segment may be coupled downstream of the exhaust turbine. As another example, while the depicted embodiment shows each of the exhaust manifold segments coupled upstream of the emission control device, in an alternate embodiment, one of the exhaust manifold segments may be coupled upstream of an emission control device catalyst while the other exhaust manifold segment may be coupled downstream of the emission control device catalyst.

Grouping of cylinders may be based on various factors such as a firing order, a location of the cylinders on the engine based on the specific engine configuration (e.g., whether they are positioned on a first engine bank or a second engine bank), as well as a configuration of the exhaust manifold (e.g., whether the exhaust manifold is segmented, integrated, etc.). In the depicted example, the engine is an in-line engine and the cylinders are grouped based on their firing order (herein, C1, then C3, then C4, then C2) such that no two consecutively firing cylinders are grouped together (herein, C1 is grouped with C4 while C2 is grouped with C3). However, in alternate embodiments, consecutively firing cylinder may be grouped together. In another example, cylinders on a first engine bank may be grouped with each other while cylinders on a second bank may be grouped with each other.

By segmenting the exhaust manifold so that exhaust from different groups of cylinders are directed to different exhaust manifold segments, and to different locations along an exhaust passage, improved pumping work and reduced flow losses can be achieved.

As described above, FIG. 2 shows a non-limiting example of an internal combustion engine and associated intake and exhaust systems. It should be understood that in some embodiments, the engine may have more or less combustion cylinders, control valves, throttles, and compression devices, among others. Example engines may have cylinders arranged in a "V" configuration. Further, a first camshaft may control the intake valves for a first group or bank of cylinders and a second camshaft may control the intake valves for a second group of cylinders. In this manner, a single CPS system and/or VCT system may be used to control valve operation of a group of cylinders, or separate CPS and/or VCT systems may be used.

As such, based on the configuration of an engine, including an engine exhaust manifold, as well as a firing order of cylinders in the engine, exhaust residuals generated during combustion in a cylinder may be received in another cylinder. For example, as illustrated in the example of FIG. 5 herein below, based on valve timings of the various cylinders, exhaust residuals from a cylinder undergoing an exhaust stroke may be unintentionally received in another cylinder concurrently undergoing an intake stroke. In particular, in engines configured with small exhaust manifolds (to address turbo lag issues), the release of a large amount of exhaust residuals into a common exhaust manifold can lead to elevated exhaust manifold pressures. The elevated exhaust manifold pressure can, in turn, overcome the exhaust valve spring pressure of a cylinder, forcing exhaust residuals from the combusting cylinder into one or more neighboring cylinders. When the exhaust valve subsequently slams shut, a characteristic ringing may occur which can be detected based on sensed engine block vibrations and distinguished from vibrations generate due to knocking and pre-ignition events based on differences in frequency content of the vibrations. Applicants have recognized that if the temperature and pressure of the exhaust residuals is sufficiently elevated, when received in a neighboring cylinder, the hot residuals may increase the recipient cylinder's propensity for pre-ignition. As an example, during transient torque requests (e.g., in response to a sudden drop in torque demand), torque control may be achieved by modifying engine parameters from nominal settings and retarding spark ignition timing. While the spark retard allows substantially immediate torque reduction to be achieved, the late combustion event generates hot exhaust residuals. When received in a first recipient cylinder, the hot residuals may not only increase the likelihood of pre-ignition in the first recipient cylinder, but may also raise the temperature of residuals generated in the first recipient cylinder such that when combustion occurs in that cylinder, a second recipient cylinder (likely to receive exhaust residuals from the first recipient cylinder) may also receive hot residuals and may pre-ignite. Thus, a cascading pre-ignition event can occur than can rapidly degrade the engine.

Figure 3:
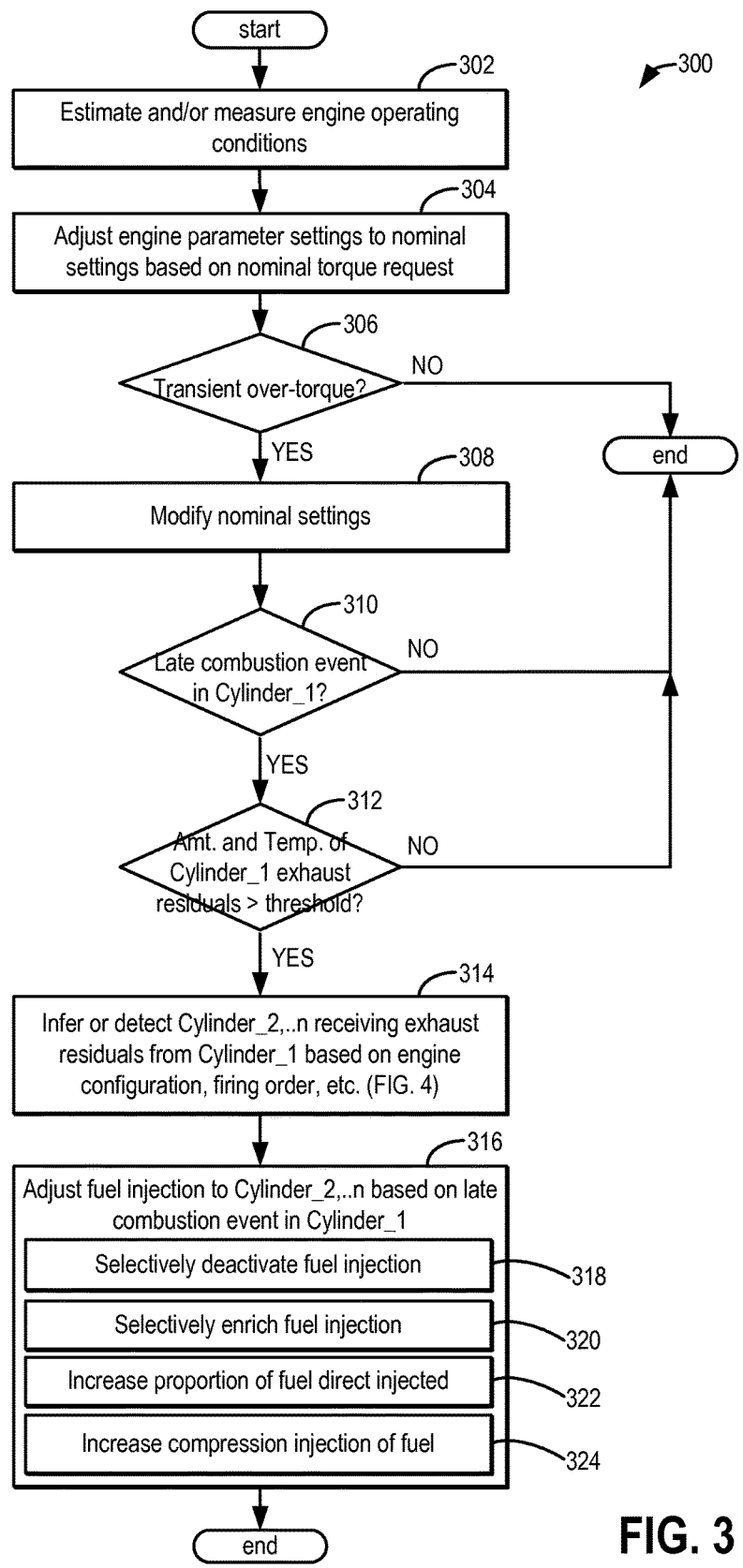
FIG. 3 shows a high level flow chart for performing a pre-ignition mitigating action in one or more cylinders responsive to late combustion in a neighboring cylinder.

As elaborated at FIG. 3, an engine controller may be configured to identify a late combustion event based on engine parameters and in response to the late combustion event, the controller may pre-empt the pre-ignition by performing a pre-ignition mitigating action in one or more cylinders that are likely to be affected by the late combustion event. Alternatively, as elaborated at FIG. 4, the controller may detect that a cylinder exhaust valve has been forced open due to the entry of hot residuals from a late combustion event based on engine block vibrations sensed in a window during an open exhaust valve of the late firing cylinder. Based on when the exhaust valve slamming occurs, and by knowing which cylinder on the bank fired late as well as which valves on the bank of cylinders are on the base circle, the controller may window where the vibration occurred along with the information properly filtered in the correct frequency spectrum, and identify which cylinder received the unintended hot residual. Additionally air mass flow rates could be used to know when the engine was at high enough loads to produce pressures high enough to unseat the exhaust valves from the corresponding late burns. By more accurately identifying the cylinder where the exhaust valve was forced open, pre-ignition mitigating actions may be appropriately performed.

In this way, the engine systems of FIGS. 1-2 enable a method for an engine wherein in response to a late cylinder combustion event (such as, in response to exhaust temperature of combustion in a first cylinder being above a threshold temperature, or a combustion timing in the first cylinder being retarded from a threshold timing), a pre-ignition mitigating action (such as cylinder fuel deactivation or cylinder fuel enrichment) is performed in a second cylinder receiving exhaust residuals from the combustion in the first cylinder. Optionally, a pre-ignition mitigating action may also be performed in a third cylinder receiving exhaust residuals from combustion in the second cylinder. By adjusting fuel injection to the recipient cylinder(s), a temperature of the residuals may be lowered in the recipient cylinder, thereby reducing the risk of cylinder pre-ignition events.

The engine system of FIGS. 1-2 also enables a method for an engine wherein in response to a sensed block vibration in a window during an open exhaust valve of a first cylinder undergoing a late combustion event and after exhaust valve closing of a second cylinder, a pre-ignition mitigating action is performed in the second cylinder. By better identifying the forced entry of late burn residuals into a cylinder, appropriate mitigating steps may be taken and late burn induced pre-ignition events can be reduced. As such, this improves engine performance.

Now turning to FIG. 3, an example routine 300 is depicted for performing a pre-ignition mitigating action in one or more cylinders in response to a late combustion event in a given cylinder. By adjusting fuel injection to one or more cylinders receiving hot exhaust residuals from combustion in the given cylinder, effective temperatures of the received residuals may be lowered, reducing the likelihood of late-burn induced pre-ignition events.

At 302, the routine includes estimating and/or measuring engine operating conditions. These include, for example, engine speed and load, torque demand, boost, manifold pressure (MAP), manifold aircharge temperature (MCT), air-fuel ratio (lambda), fuel alcohol content, barometric pressure, ambient conditions (e.g., ambient temperature, pressure, humidity, etc.), engine pre-ignition history, etc. At 304, engine parameter settings may be adjusted based on the estimated engine operating conditions. For example, based on a nominal torque request, engine parameter settings of boost, valve timing, spark ignition timing, etc., may be set to nominal settings. As an example, spark timing may be set to MBT or borderline spark.

At 306, it may be determined if there is a transient over-torque. That is, it may be determined if a sudden drop in torque demand has occurred and the available torque is more than the demanded torque. Transient over-torque conditions may occur during a tip-out or a transmission shift, for example. Herein, the transient torque reduction may allow the torque to be temporarily reduced and provide a smoother shift feel. As further examples, transient over-torque conditions may occur due to engine idle speed over-speed conditions, or due to a transient change in requested EGR. If there is not transient over-torque, the routine may end. Upon confirming a transient over-torque condition, at 308, the nominal engine parameter settings may be adjusted. As non-limiting examples, to provide the torque reduction, boost level may be lowered, EGR valve settings may be adjusted (e.g., to increase EGR delivered to the engine while decreasing fresh intake air delivered to the engine), intake and/or exhaust valve timings may be adjusted, spark timing may be retarded (from MBT or borderline spark settings), etc. In one example, a feedback torque controller may be configured to move the engine parameter settings from the nominal settings in response to the over-torque condition. The nominal settings may be temporarily adjusted to provide the torque reduction and then returned to the original (nominal) settings. For example, spark timing may be temporarily retarded from MBT and then returned back to the nominal setting.

As such, spark retard from MBT or borderline spark settings may be advantageously used to provide a fast (substantially immediate) torque reduction response. This allows transient torque control to be rapidly achieved. However, the retarded spark setting can also cause late combustion burning cycles in the engine. Specifically, the retarded spark can lead to a late combustion event wherein cylinder combustion occurs at a time or crank angle location that is later than was intended (that is, later than would occur if the engine parameter settings were maintained at the nominal settings). In some engine configurations, such as with a boosted engine, the late combustion may be much later than intended.

The late combustion in a cylinder can lead to the generation of hot exhaust residuals in the cylinder, as well as high exhaust manifold pressures. If a large amount of hot residuals are generated in the cylinder, the residuals can lead to abnormal combustion events, such as misfires and/or pre-ignition events, in one or more neighboring cylinders. Specifically, the large amount of hot residuals can be received in a neighboring cylinder during the valve overlap period. Alternatively, or additionally, the hot residuals can force open the exhaust valve of a neighboring cylinder. In particular, the hot residuals can elevate the exhaust manifold pressure to levels that cause a neighboring cylinder exhaust valve spring pressure to be overcome, forcing the hot exhaust residuals into the neighboring cylinder. In either case, the hot residuals can substantially raise the temperature in the cylinder receiving the residuals, and make that cylinder prone to pre-ignition. In addition, hot residuals received in a first recipient cylinder can raise the exhaust temperature of combustion in the first recipient cylinder such that a second recipient cylinder receiving exhaust residuals from the first recipient cylinder also becomes prone to misfires and pre-ignition events. Additionally, the elevated exhaust manifold pressure due to the hot residuals can spin a turbine and increase the amount of air inducted into the cylinders, further raising the likelihood of cylinder pre-ignition events. The problem may be exacerbated in engines configured with small volume exhaust manifolds (such as those used to reduce turbo lag issues).

Thus, at 310, it is determined if there is a late combustion event. In particular, based on the modified engine parameter settings, it may be determined if there is a late combustion event in a first cylinder (Cylinder_1). In one example, the late combustion event in the first cylinder is inferred based on one or more of the cylinder's (intake and/or exhaust) valve timing, spark timing, spark plug ionization current, crankshaft acceleration, and cylinder pressure. For example, a late combustion may be determined in response to a combustion timing of the cylinder being retarded from a threshold timing. This may include an intake and/or exhaust valve timing of combustion in the first cylinder being retarded from a threshold valve timing and/or a spark timing of combustion in the first cylinder being retarded from a threshold spark timing (e.g., from MBT).

Upon confirming a late combustion event in the first cylinder, at 312, it may be determined if an exhaust temperature of combustion in the first cylinder (that is, a temperature of exhaust residuals generated at the first cylinder) is higher than a threshold temperature. It may also be determined if an amount of exhaust residuals released from the first cylinder is higher than a threshold amount. As such, if the temperature and amount of exhaust residuals generated by the late combustion event in the first cylinder is higher than the threshold, there is a likelihood that the residuals will force open the exhaust valve of a neighboring cylinder, causing residuals to be forced into that cylinder. Thus, in response to the exhaust temperature of combustion in the first cylinder being above the threshold temperature, and the amount of exhaust residuals released from the first cylinder being higher than the threshold amount, the engine controller may perform a pre-ignition mitigating action in one or more cylinders (Cylinder_2, . . . n), receiving (progressively) exhaust residuals from the combustion in the first cylinder, as elaborated below.

Specifically, at 314, the routine includes determining which cylinder is receiving exhaust residuals from the late burn event in the first cylinder. This may include inferring (or identifying) a second cylinder (Cylinder_2) that will receive (or is receiving) exhaust residuals from the combustion in the first cylinder based at least on an identity of the first cylinder and a firing order of the engine. For example, in a four cylinder in-line engine having consecutively positioned cylinders numbered 1 through 4, and wherein a firing order of the cylinders includes cylinder number 1 firing first, followed by cylinder number 3, then cylinder number 4 and finally cylinder number 2, it may be determined which of cylinders 1-4 incurred the late combustion to identify which cylinder will most likely receive the hot exhaust residuals. Herein, if cylinder number 1 is the first cylinder incurring the late combustion, cylinder number 2 is most likely to receive the exhaust residuals since cylinder number 2 will be in an intake stroke (providing least resistance to the entry of residuals) when cylinder number 1 is in the exhaust stroke, while the other cylinders will be in power or compression strokes (providing higher resistance to the entry of residuals). However, if cylinder number 4 is the first cylinder incurring the late combustion, cylinder number 3 will most likely receive the exhaust residuals since cylinder number 3 will be in an intake stroke (providing least resistance to the entry of residuals) when cylinder number 4 is in the exhaust stroke. As such, the identity of the cylinder receiving residuals would be different if the engine was a 6-cylinder in-line engine, or if the engine was a four cylinder V-shaped engine with different cylinders of different engine banks. In one example, where the engine has different groups of cylinders on different banks, the first cylinder undergoing the late combustion and the second cylinder receiving the exhaust residuals may be located on a common engine bank.

In some embodiments, the second cylinder may be further identified based on an exhaust manifold configuration. For example, the identity of the second cylinder may be based on whether the exhaust manifold was integrated or segmented (such as the segmented exhaust manifold in the engine system of FIG. 2). As an example, if the exhaust manifold is segmented, it may be determined which cylinders are grouped to a common exhaust manifold segment such that they discharge exhaust through a common conduit. Herein, the first cylinder undergoing the late combustion and the second cylinder receiving the exhaust residuals may be coupled to the common exhaust manifold, even if located at different positions on the engine.

In other embodiments, as elaborated at FIG. 4, the controller may determine which cylinder received the exhaust residuals by utilizing the system knock sensors coupled along the engine block to detect if an exhaust valve has been forced open. In particular, after an exhaust valve of a neighboring cylinder is forced open at high pressure, the exhaust valve slams into the exhaust seat upon return. This slamming occurs because the exhaust valve is on the base circle of the camshaft, and is not following the exhaust cam profile for that particular cylinder in the bank of cylinders. When the slamming occurs it generates vibrations which cause the knock sensors to resonate. By knowing which cylinder on the bank recently fired (late), and which exhaust valves on the bank of cylinders are on the base circle, it is possible for the controller to window where the vibration occurred. This information along with the sensor output properly filtered in the correct frequency spectrum enables the controller to identify which cylinder received the unintended hot residual. Additionally air mass flow rates could be used to know when the engine was at high enough loads to produce pressures high enough to unseat the exhaust valves from the corresponding late burns. In one example, in response to a sensed block vibration in a window during an open exhaust valve of a first cylinder undergoing a late combustion event and after exhaust valve closing of a second cylinder, the controller may infer that the second cylinder received unintended hot residuals from the first cylinder and accordingly perform a pre-ignition mitigating action in the second cylinder.

In some embodiments, one or more cylinders that will be progressively affected by the residuals generated in the first cylinder may be identified. For example, in addition to identifying a second cylinder receiving (or most likely to receive) exhaust residuals from the first cylinder, a third cylinder likely to receive residuals from the second cylinder may also be identified. This is because the hot residuals received in the second cylinder may not only cause the second cylinder to potentially pre-ignite, but the received hot residuals may also lead to elevated exhaust temperatures upon combustion in the second cylinder, which can force hot residuals into the third cylinder and increase the third cylinder's propensity for pre-ignition.

Upon identifying the second cylinder, at 316, the routine includes performing a pre-ignition mitigating action in the second cylinder receiving the exhaust residuals from the first cylinder (e.g., by adjusting fuel injection to the second cylinder). It will be appreciated that while the depicted embodiment shows performing the pre-ignition mitigating action in a second cylinder upon confirming a late combustion event in a first cylinder having an amount and temperature of exhaust residuals that is higher than a threshold, in alternate embodiments, the pre-ignition mitigating action may be performed upon confirming either the exhaust temperature of combustion in the first cylinder is higher than a threshold temperature or an amount of exhaust residuals is higher than a threshold amount. That is, pre-ignition may be considered likely if a small amount of hot residuals, or a large amount of cool residuals, are released.

Returning to 316, performing a pre-ignition mitigating action in the second cylinder may include, at 318, selectively deactivating fuel injection to the second cylinder. Alternatively, performing a pre-ignition mitigating action in the second cylinder may include, at 320, adjusting fuel injection to the second cylinder to be richer than stoichiometry. Herein, a degree of richness of the rich fuel injected may be adjusted based on the degree of lateness of the combustion timing in the first cylinder. For example, as the degree of lateness of the combustion timing in the first cylinder increases, a degree of richness of the rich fuel injection in the second cylinder may be increased. Alternatively, the degree of lateness may be inferred based on the amount and temperature of the residuals and the degree of richness may be adjusted based on the amount and temperature of the residuals relative to the respective thresholds. For example, the degree of richness of the rich fuel injected may be adjusted based on a difference between the exhaust temperature of combustion in the first cylinder and the threshold temperature, the degree of richness increased as the difference increases.

As still another example, performing a pre-ignition mitigating action may include, at 322, increasing a proportion of fuel (for a rich fuel injection) that is direct injected into the affected cylinder while correspondingly decreasing a proportion of fuel that is port injected into the affected cylinder. In embodiments where the cylinder is configured to receive two or more fuels of differing octane contents, the controller may provide a rich fuel injection by increasing direct injection of a first fuel having a higher octane content while correspondingly decreasing port injection of a second fuel having a lower octane content into the affected cylinder. The split ratio may be based on the degree of lateness of the combustion timing in the first cylinder. The direct injection may be continued for a number of combustion events that is based on the degree of lateness of the combustion timing in the first cylinder. Alternatively, the direct injection may be continued until a temperature of the exhaust residuals entering the second cylinder is below the threshold temperature.

As yet another example, performing a pre-ignition mitigating action may include, at 324, retarding a fuel injection timing of rich fuel injection in the affected cylinder towards a compression stroke and delivering the fuel over multiple compression stroke injections. The fuel injection timing retard and the number of compression stroke injections may be based on the degree of lateness or spark timing delay in the first cylinder.

By performing a pre-ignition mitigating action in the second cylinder, various advantages are achieved. First, the selective fuel deactivation or cylinder fuel enrichment is performed to reduce pre-ignition in the second cylinder. Herein, pre-ignition is mitigated due to cooling of the residuals in the second cylinder via the fuel deactivation or fuel enrichment. In addition, the lowered temperature of exhaust residuals in the second cylinder lowers the exhaust temperature of combustion in the second cylinder. That is, the second cylinder is now less likely to release hot residuals, and thus pre-ignition in a third cylinder receiving exhaust residuals from the second cylinder may also be mitigated.

In some embodiments, in addition to performing the pre-ignition mitigating action in the second cylinder, a pre-ignition mitigating action may also be performed in the third cylinder. As one example, in response to a timing of combustion in a first cylinder being later than a threshold, the engine controller may selectively deactivate fuel injection to the second cylinder receiving exhaust residuals from the first cylinder as well as selectively deactivating fuel injection to the third cylinder expected to receive exhaust residuals from the second cylinder. As another example, each of the second and the third cylinder may be enriched in response to the late combustion event in the first cylinder. However, the degree of enrichment may vary with the second cylinder having a higher degree of enrichment that the third cylinder. As such, the pre-ignition mitigating action is performed before receiving an indication of pre-ignition in each of the first, second, and third cylinders.

In still other embodiments, in addition to performing the pre-ignition mitigating action in the second cylinder, a pre-ignition mitigating action may also be performed in the first cylinder undergoing the late combustion. As such, this may be performed in engines configured with direct fuel injection where fuel can be rapidly delivered directly into the cylinder. For example, in response to a timing of combustion in the first cylinder being later than a threshold, the engine controller may late inject (via direct fuel injection) an amount of fuel into the first cylinder to generate exhaust residuals that are richer than stoichiometry. The late fuel injection may include an additional fuel injection in the exhaust stroke of the first cylinder. Herein, the late fuel injection may provide multiple advantages. First, the late fuel injection may help in cooling the temperature of the exhaust residuals received in the second cylinder despite the first cylinder undergoing a late combustion event. As such, this allows pre-ignition in the second cylinder to be pre-empted. In addition, part of the pre-ignition mitigating enrichment required in the second cylinder may be provided via the late fuel injection to the first cylinder itself. As an example, a portion of the fuel enrichment required in the second cylinder may be provided as a late (rich) fuel injection in the exhaust stroke to the first cylinder, while a remaining portion of the required the fuel enrichment is provided via a rich fuel injection in the second cylinder.

It will be appreciated that while the routine of FIG. 3 shows a late combustion event being monitored in response to a transient over-torque condition, this is not meant to be limiting. In alternate embodiments, the controller may continuously monitor late combustion events in all engine cylinders under all conditions and perform mitigating actions in response to any cylinder late combustion event. In still further embodiments, the controller may look at late combustion events in high air mass flow regions where the exhaust manifold volume comes more into play.

In this way, by adjusting fuel injection to a cylinder receiving a large amount of hot exhaust residuals from a late combustion event in a neighboring cylinder, late burn induced pre-ignition events may be better anticipated and mitigated.

In one example, in response to combustion timing in a first cylinder being retarded from a threshold timing, a controller may selectively enrich fuel injection to one or more cylinders, including a second cylinder, receiving exhaust residuals from combustion in the first cylinder. The entry of exhaust residuals into the second cylinder may be inferred based on cylinder firing order and engine conditions at the time of late combustion in the first cylinder. Alternatively, the entry of residuals may be detected based on engine block vibrations sensed in a window during an open exhaust valve event of the first cylinder. The retarded combustion timing in the first cylinder may include a spark timing, an intake valve timing and/or an exhaust valve timing, wherein the combustion timing being retarded from the threshold timing is based on one or more of crankshaft acceleration, spark plug ionization current, and cylinder pressure.

A degree of richness of the rich fuel injection to the second cylinder may be adjusted based on a degree of lateness of the combustion timing in the first cylinder from the threshold timing, with the degree of richness increased as the degree of lateness increases. The degree of richness may be further based on a number of deactivated engine cylinders. For example, it may be determined whether the engine is in a VDE mode of operation, and if so, how many cylinders are deactivated and their location on the engine (e.g., which bank, their firing order, etc.). The degree of richness of the rich fuel injection may also be based on a temperature of the exhaust residuals received so as to bring an exhaust temperature of combustion in the second cylinder below a threshold temperature. In some embodiments, a larger portion of the rich injection may be direct injected while a smaller portion of the rich injection is direct injected. Additionally, a timing of the rich injection may be retarded towards the compression stroke while the injection is split into a number of compression stroke injections. In some embodiments, selectively enriching fuel injection to one or more cylinders includes enriching fuel injection to a second cylinder receiving exhaust residuals from combustion in the first cylinder, and further enriching fuel injection to a third cylinder expected to receive exhaust residuals from combustion in the second cylinder. Herein, the enrichment of the second cylinder may be higher than the enrichment of the third cylinder. The controller may optionally also perform a late fuel injection in the first (late combusting) cylinder to selectively enrich the exhaust residuals received in the second cylinder.

Under certain operating conditions, cylinder pre-ignition events may still occur due to, for example, the combustion timing in the first cylinder being incorrectly estimated/inferred. As an example, based on cylinder valve timings, crankshaft acceleration, boost level, etc., a first amount of combustion timing delay may be estimated in a first cylinder, the first amount of combustion timing delay being less than a threshold amount of delay. As a result, it may be determined that the late combustion timing in the first cylinder may not cause forced entry of exhaust residuals into a second cylinder, and no pre-ignition mitigating action may be taken in the second cylinder. That is, fuel enrichment or fuel deactivation may not be performed in the second cylinder. However, due to errors in the estimation of valve timing, crankshaft acceleration, boost level, etc., the combustion timing delay in the first cylinder may actually be a second, larger amount of combustion timing delay, the second amount larger than the threshold amount of delay. As a result, pre-ignition may occur in the second cylinder.

If pre-ignition does occur in the second cylinder receiving exhaust residuals from a first cylinder undergoing late combustion (and is identified from a sensor such as an engine block accelerometer or other knock sensor), the engine controller may be configured to adaptively learn the combustion timing of the first cylinder. This allows the engine control system to better determine the error in estimating combustion timing delay of the first cylinder, and apply that error adaptively for future combustion timing delay estimations. For example, in response to a pre-ignition event in a second cylinder receiving exhaust residuals from combustion in a first cylinder, the controller may be configured to adaptively learn a combustion timing delay in the first cylinder, and adjust one or more parameters or factors used in a combustion timing delay estimation model. For example, the controller may adjust adaptive parameters stored in computer memory to increase the combustion timing estimated for such conditions so that during subsequent operation, the combustion timing is more accurately identified and so that mitigating actions in the second cylinder can be implemented. In this way, the controller may be able to learn from sensed cylinder pre-ignition events so as to reduce the likelihood of future pre-ignition events.

Now turning to FIG. 4, an example routine 400 is shown for detecting exhaust valve slamming events and differentiating them from abnormal cylinder combustion events. The exhaust valve slamming or ringing may occur due to hot exhaust residuals generated from a late combustion event in a cylinder being forced into a neighboring cylinder. By monitoring engine block vibrations sensed in a window during an open exhaust valve of the late combusting cylinder, exhaust valve ringing events can be better detected and the affected cylinder can be better identified. By filtering the output from one or more engine block knock sensors through different band-pass filters, vibrations arising due to a cylinder knock or pre-ignition event can be differentiated from the forced entry of residuals into a cylinder based at least on frequency content.

At 402, the method includes estimating a knock sensor output from one or more engine block knock sensors in one or more windows during an open exhaust valve of a first cylinder (Cylinder_1) undergoing a late combustion event. The first cylinder undergoing the late combustion event may include a spark timing of the first cylinder being delayed from MBT (or nominal settings or borderline spark). The one or more windows may be crank angle windows and the knock sensor outputs may be reflective of sensed engine block vibrations. In the depicted example, engine block vibrations are sensed in each of a first window (window1) and a second window (window2). Window2 may be earlier than window1. In some examples, window1 and window2 may be at least partially overlapping.

As such, the one or more windows may be adjusted based at least on the valve timing of the cylinder firing late so that the windows are during an open exhaust valve of the late firing cylinder. In addition, the windows may be adjusted based on the configuration of the engine cylinders (e.g., based on the whether the engine has 4 cylinders or 6 cylinders, based on whether the cylinders are in-line or on different banks in a V-engine). The different windows may be adjusted so as to differentiate abnormal combustion events in a cylinder that is currently firing (such as knock or pre-ignition events occurring in a third cylinder that is in a power stroke and that is firing immediately after the first cylinder) from exhaust valve slamming events occurring due to unintended entry of exhaust residuals into a cylinder that is not currently firing (such as a second cylinder that is in an intake stroke and is therefore most likely to receive exhaust residuals from the late burning first cylinder). For example, the first window may be adjusted to be after exhaust valve closing and after intake valve opening of the second cylinder but before intake valve closing of the second cylinder. Engine block vibrations sensed in this window may be reflective of exhaust valve slamming in the second cylinder (based on their amplitude and frequency content relative to a threshold). The first window may also be before a spark ignition event in the second cylinder but after a spark ignition event in a third cylinder firing immediately after the first cylinder (that is, the first window is between spark ignition events). In comparison, the second window may be an earlier window adjusted to be from before a spark ignition event in the third cylinder until after the spark ignition event in the third cylinder (e.g., from TDC in the third cylinder to before intake valve closing in the second cylinder). That is, the second window is around a spark ignition event in the third cylinder. Engine block vibrations sensed in this window may be reflective of knock or pre-ignition events in the third cylinder (based on their amplitude and frequency content relative to a threshold).

At 404 and 420, the sensed engine block vibrations (that is, the knock sensor outputs) are filtered through different band-pass filters so as to filter out their signal content in specific frequency ranges. As such, the mechanical noise generated by the slamming or popping of an exhaust valve may be different from the vibrations generated during combustion knock or pre-ignition and therefore may require different filtering within a given window. Specifically, at 404, the engine block vibrations sensed in the first window may be filtered through a first band-pass filter so that the sensor output can be assessed in a first frequency range. Likewise, at 420, the engine block vibrations sensed in the second window may be filtered through a second, different band-pass filter so that the sensor output can be assessed in a second, different frequency range. At 406, after filtering the sensor output in the first window through the first filter, it may be determined if the amplitude of the sensed block vibration in the first window is larger than a first (exhaust valve popping) threshold amplitude. If not, the routine may end with no exhaust valve slamming being determined. In comparison, if the amplitude is higher than the first threshold amplitude, then at 408, it may be determined that the exhaust valve of a second cylinder (Cylinder_2) was forced open due to the forced entry of hot residuals from the late combusting first cylinder (Cylinder_1). In particular, in response to an amplitude of the sensed engine block vibration being higher than a threshold amplitude at a selected frequency range in the window, exhaust valve slamming at the second cylinder may be determined.

In response to the sensed engine block vibration and the determination of unintended exhaust residuals entering the second cylinder, at 410, the routine includes performing a pre-ignition mitigating action in the second cylinder. Herein, the pre-ignition mitigating action is performed before receiving an indication of pre-ignition in the second cylinder. That is, the pre-ignition mitigating action is performed in anticipation of a late burn induced pre-ignition in the second cylinder.

The pre-ignition mitigating actions performed may include, selectively deactivating fuel injection to the second cylinder (at 411), selectively enriching fuel injection to the second cylinder (at 412), increasing direct injection of a first fuel having a higher octane content while correspondingly decreasing port injection of a second fuel having a lower octane content into the second cylinder (at 413), and/or retarding fuel injection timing of the second cylinder towards a compression stroke and delivering fuel over multiple compression stroke injections (at 414). Herein, the fuel injection timing retard and a number of compression stroke injections may be based on the spark timing delay in the first cylinder.

Returning to 420, after filtering the sensor output in the second window through the second filter, at 422, it may be determined if the amplitude of the sensed block vibration in the second window is larger than each of a second (pre-ignition) and third (knock) threshold. The third threshold may be lower than each of the first and second threshold and the second threshold may be higher than the first threshold. If yes, then at 424, a cylinder pre-ignition event in the third cylinder (Cylinder_3) may be determined. In particular, an indication of cylinder pre-ignition may be determined after an occurrence of cylinder pre-ignition in the third cylinder. In one example, the sensed engine block vibrations may indicate incipient pre-ignition in Cylinder_3. Accordingly, a pre-ignition mitigating action may be performed in Cylinder_3. These may include fuel deactivation, fuel enrichment, increased direct injection, and/or multiple compression stroke fuel injections, as elaborated at 410. However, the degree of the pre-ignition mitigating action may be more aggressive and based on the magnitude of the indication of pre-ignition (e.g., based on the difference of the knock sensor output from the second threshold). For example, the degree of richness of the rich fuel injection used to mitigate the incipient cylinder pre-ignition in Cylinder_3 may be higher than the degree of richness of the rich fuel injection used to mitigate the potential late burn induced pre-ignition in Cylinder_2.

If the amplitude of the filtered sensor output in the second window is not higher than each of the second and third thresholds, then at 426, it may be determined if the filtered sensor output is higher than the third threshold and lower than the second threshold. Herein, the second, higher threshold may correspond to a pre-ignition threshold while the third, lower threshold corresponds to a knock threshold. Thus, if the filtered sensor output is lower than the second threshold but higher than the third threshold, then at 428, an occurrence of cylinder knock in Cylinder_3 may be determined and a knock mitigating action may be performed in the third cylinder. This may include, for example, retarding spark by an amount or increasing an amount of exhaust gas recirculation (EGR). As such, if the amplitude is not higher than the second threshold, the routine may end with no abnormal combustion event detected in Cylinder_3.

In this way, the output from the same knock sensor (or same set of knock sensors) can be advantageously used to detect the forced entry of exhaust residuals from a late combusting cylinder into a neighboring cylinder as well as to detect a cylinder knock or pre-ignition event in a cylinder that has just fired. By filtering the sensor outputs differently and analyzing their frequency content differently, engine block vibrations with more prominent ringing can be better ascribed to abnormal combustion events while engine block vibrations with less prominent ringing can be ascribed to exhaust valve slamming events. By adjusting the mitigating actions accordingly, engine life can be improved.

It will be appreciated that while the above routine depicts assessing the engine block vibrations in each of a first and second window, it will be appreciated that in alternate embodiments, the engine block vibrations may be sensed in a single, common window and the outputs may be frequency filtered differently for detecting forced residual entry into one cylinder or detecting knock or pre-ignition in another engine cylinder. For example, following a late burn event in a first cylinder, a knock sensor output may be estimated in a common, wider window and filtered through each of a first filter and a second filter to provide a filtered output in a first frequency range and a second frequency range respectively. In response to an amplitude of the filtered output in the first frequency range being higher than a first threshold, exhaust valve slamming in a second cylinder may be determined. In response to an amplitude of the filtered output in the second frequency range being lower than a second threshold but higher than a third threshold (wherein the third threshold is lower than the second threshold), knock in a third cylinder may be determined. In response to an amplitude of the filtered output in the second frequency range being higher than each of the second threshold and the third threshold, pre-ignition in the third cylinder may be determined. In one example, the second threshold for pre-ignition detection may be higher than the first threshold for forced exhaust residual entry detection, and each of the first and second thresholds may be higher than the third threshold used for knock detection. However, in alternate examples, the thresholds may vary based on the particular configuration of the engine. In one example, Now turning to FIG. 5, an example detection of exhaust valve popping is shown. At FIG. 6, a fuel injection adjustment performed responsive to the detection of FIG. 5 is shown.

At FIG. 5, map 500 shows a four cylinder in-line engine having cylinders 1-4 arranged consecutively along an engine block (not shown), wherein cylinders 1-4 are configured to fire in the order 1-3-4-2. Map 500 depicts intake valve timings (solid line) and exhaust valve timings (dashed line) with respect to engine piston position being in an intake stroke (I), exhaust stroke (E), power stroke (P) or compression stroke (C). Map 500 further depicts cylinder spark ignition events by stars 501, 503, 505, 507.

The first plot from the top of the figure represents position of cylinder number one (cylinder 1). And, in particular, the stroke of cylinder number one as the engine crankshaft is rotated. Cylinder 1 strokes are labeled according to the engine position. For example, cylinder 1 is shown first in an intake stroke (I), the engine rotates and cylinder number one enters the compression stroke (C) followed by power (P) and exhaust (E) strokes. The cylinder cycle for cylinder 1 then repeats. For a four stroke engine a cylinder cycle may be 720°, the same crankshaft interval for a complete cycle of the engine.

The second plot from the top of the figure, likewise represents position of cylinder number three (cylinder 3), in particular, the stroke of cylinder number three as the engine crankshaft is rotated. Cylinder 3 strokes are labeled according to the engine position. For example, Cylinder 3 is shown first in an exhaust stroke (E), the engine rotates and cylinder number three enters the intake stroke (I), followed by compression (C) and power (P) strokes. The cylinder cycle for Cylinder 3 then repeats. The third plot from the top of the figure, likewise represents position of cylinder number four (cylinder 4), in particular, the stroke of cylinder number four as the engine crankshaft is rotated. Cylinder 4 strokes are labeled according to the engine position. For example, Cylinder 4 is shown first in power stroke (P), the engine rotates and cylinder number four enters the exhaust stroke (E), followed by intake (I) and compression (C) strokes. The cylinder cycle for Cylinder 4 then repeats. The fourth plot from the top of the figure, likewise represents position of cylinder number two (Cylinder 2), in particular, the stroke of cylinder number two as the engine crankshaft is rotated. Cylinder 2 strokes are labeled according to the engine position. For example, Cylinder 2 is shown first in a compression stroke (C), the engine rotates and cylinder number two enters the power stroke (P), followed by exhaust (E) and intake (I) strokes. The cylinder cycle for Cylinder 2 then repeats.

The star at label 501 indicates the ignition event for a first combustion event in cylinder 1. The ignition may be initiated by a spark plug. In this sequence, cylinder number one valves are open for at least a portion of the intake stroke to provide air to the cylinder. Fuel may be injected to the engine cylinders by port or direct injectors. The fuel and air mixture are compressed and ignited during the compression stroke. Peak cylinder pressure may occur at top-dead-center of compression stroke or during the expansion stoke. Subsequent combustion events in cylinders 3, 4, and 2 are shown at 503, 505, and 507, in that order.

In the depicted example, the spark ignition event 501 in Cylinder 1 occurs with spark retard such that the ignition event is delayed later into the power stroke. As a result of the late combustion event, a large amount of hot exhaust residuals are discharged from Cylinder 1 during the exhaust stroke when the exhaust valve open (plot 502). Due to the configuration of the engine, cylinder number two (Cylinder 2) is in an intake stroke (plot 503) at the same time as Cylinder 1 is in exhaust stroke (plot 502), providing relatively less resistance to the entry of residuals. In comparison, cylinder number three (Cylinder 3) and cylinder number four (Cylinder 4) are in power and compression strokes respectively at the same time as Cylinder 1 is in the exhaust stroke, providing relatively more resistance to the entry of residuals. As a result, the hot exhaust residuals generated from the late combustion event in Cylinder 1 are most likely to be received in Cylinder 2, potentially increasing the propensity for Cylinder 2 to pre-ignite. As such, since neither of cylinder numbers three and four (Cylinder 3, Cylinder 4) are likely to receive exhaust residuals from the late combustion event in Cylinder 1, neither is likely to be affected by the late combustion event.

The release of exhaust residuals from Cylinder 1 can elevate the exhaust manifold pressure to levels that can overcome the exhaust valve spring pressure of Cylinder 2. As such, when the exhaust valve is forced open at high pressure, it slams upon return to the exhaust valve seat, generating a characteristic mechanical noise, herein also referred to as exhaust valve popping, slamming or ringing, depicted herein at plot 503. When the slamming occurs, it causes an engine block sensor to resonate. The slamming occurs because the exhaust valve is on the base circle of the camshaft and is not following the exhaust cam profile for that particular cylinder in the bank of cylinders. As such, this mechanical noise may be distinct from engine block vibrations sensed during pre-ignition and knock. In particular, the different vibrations may have different frequency content. Thus, by filtering engine block vibrations sensed in a window during an open exhaust valve of the late firing cylinder through different band-pass filters, the output from the same set of knock sensors can be used to identify knock or pre-ignition in a recently firing cylinder as well as exhaust valve slamming in a neighboring cylinder. In still further embodiments, air mass flow rates can be additionally used to determine when the engine was at high enough loads to produce pressures high enough to unseat the exhaust valves of neighboring cylinder from the corresponding late burns.

In the depicted example, the engine block vibrations are sensed in each of a first window w1 and a second window w2 wherein both windows are during an open exhaust valve (plot 502) of the late firing cylinder (herein Cylinder 1). Specifically, the first window w1 is a window that is relatively later during the open exhaust valve of the late combusting first Cylinder 1 and wherein the second window w2 is a window that is relatively earlier during the open exhaust valve of the first cylinder. In the depicted example, w1 and w2 are shown as non-overlapping windows. However, it will be appreciated that in alternate embodiments, the first and second windows may be at least partially overlapping. In the present example, the first window is adjusted to be during the open exhaust valve of the first cylinder, after exhaust valve closing and intake valve opening of the second cylinder (Cylinder 2) and before intake valve opening of the second cylinder. As such, the first window is also between spark ignition events. In particular, the first window is after a spark ignition event 503 in the third cylinder firing immediately after the first cylinder, and before spark ignition events 505 and 507 in the fourth and second cylinders respectively, wherein the fourth cylinder fires after the third cylinder. In comparison, the second window is in a range covering the spark ignition event in the third cylinder. For example, the second window may start at or before TDC of Cylinder 3 and end after spark ignition event 503 in Cylinder 3.

It will be appreciated that based on the identity of the late combusting cylinder, the windows may be continually updated. For example, if the late combusting cylinder is Cylinder 3, the windows may shift so that engine block vibrations are sensed in a window during the open exhaust valve of Cylinder 3, so as to look for exhaust valve popping at Cylinder 1 (the most likely candidate) and abnormal combustion events at Cylinder 4 (the cylinder firing immediately after Cylinder 3).

Engine block vibrations sensed in the first window w1 may be filtered through a first band-pass filter so that their frequency content is assessed in a first frequency range. Engine block vibrations sensed in the second window w2 may then be filtered through a second, different band-pass filter so that their frequency content is assessed in a second, different frequency range. In response to the filtered knock sensor outputs in the first window being higher than a first threshold, the engine block vibrations sensed in the first window w1 may be attributed to the untimely opening and subsequent slamming of the exhaust valve of Cylinder 2, depicted at plot 503.

In response to the detection of exhaust valve popping, the engine controller may perform a pre-ignition mitigating action in Cylinder 2 to reduce the likelihood of late burn induced pre-ignition. As elaborated previously, these actions may include, for example, selective fuel deactivation, selective fuel enrichment, increased direct injection of fuel, and/or increased compression stroke injection of fuel to the affected cylinder.

In response to engine block vibrations sensed in the second window, the controller may determine an abnormal combustion event in the cylinder that is firing at that time, that is, Cylinder 3. The controller may compare the outputs relative to distinct knock and pre-ignition thresholds to determine if the abnormal combustion event in the third cylinder is due to knock or pre-ignition. For example, in response to an amplitude of the filtered knock sensor output in the second window at the second frequency range being higher than each of a second and third threshold, the engine block vibrations sensed in the second window w1 may be attributed to a pre-ignition event in Cylinder 3. However, if the amplitude of the filtered knock sensor output in the second window at the second frequency range is higher than the third threshold but lower than the second threshold, the engine block vibrations sensed in the second window w1 may be attributed to a knock event in Cylinder 3. In response to the indication of knock, a knock mitigating action may be performed in Cylinder 3 while in response to the indication of pre-ignition, a pre-ignition mitigating action may be performed in Cylinder 3.

It will be appreciated that the pre-ignition mitigating action performed in Cylinder 3 responsive to the indication of cylinder pre-ignition may be more aggressive than the pre-emptive pre-ignition mitigating action performed in Cylinder 2 responsive to the indication of exhaust valve slamming.

In this way, the output from the same set of knock sensors can be used to detect exhaust valve slamming in a cylinder and to distinguish the vibrations caused by exhaust valve slamming from those caused by knock and pre-ignition in a cylinder undergoing a spark ignition event. By improving the accuracy of detection of forced residual entry, mitigating actions can be timely performed.

It will be appreciated that during some conditions, such as when valve durations are longer than depicted, the high exhaust manifold pressure generated from the residuals released by Cylinder 1 can affect the valve overlap of Cylinder 2. In particular, the high pressure of the exhaust residuals can cause residuals to be forcibly delivered into Cylinder 2 during a period of positive valve overlap. As such, since the residuals enter while the intake and exhaust valves of Cylinder 2 are open, mechanical noise and vibrations related to exhaust valve ringing may not be observed during these conditions. Thus, engine block vibrations may not be detected in the window during an open exhaust valve event of Cylinder 1. During these conditions, pressure transducers, ion sensors, and/or exception processing of crankshaft acceleration data may be used to determine where the late burn occurred (in the crank angle domain) to confirm if the exhaust residuals could affect the valve overlap period of a neighboring cylinder, and to identify residual entry into the cylinder. For example, forced residual entry can be detected based on a substantially elevated in-cylinder pressure.

Figure 6:
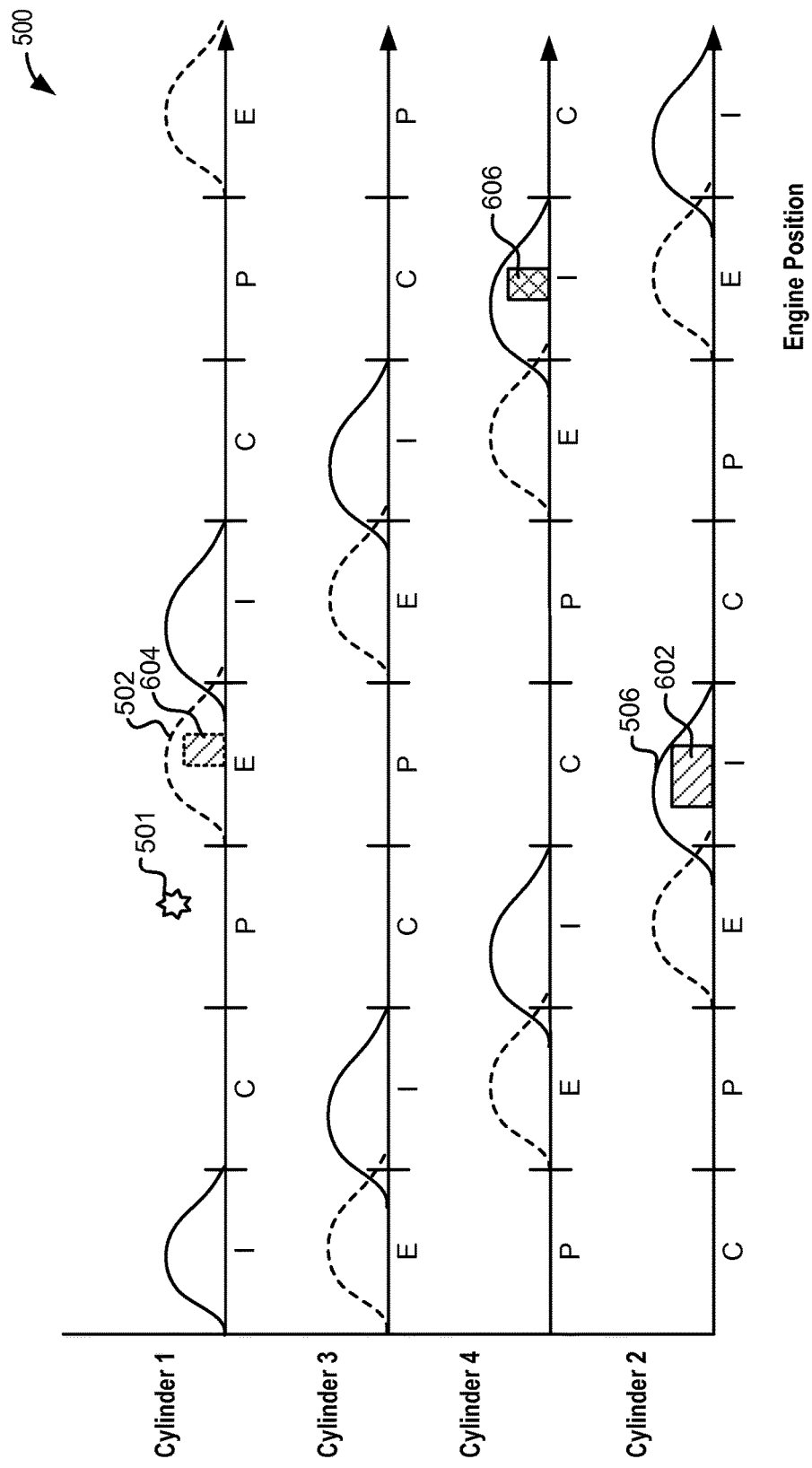
FIGS. 6-7 show example cylinder enrichments, according to the present disclosure.

Now turning to FIG. 6, map 600 shows an example engine fuel injection adjustment that is performed in response to the exhaust valve popping detection shown at FIG. 5. As such, FIG. 6 shows the same engine configuration as FIG. 5. Therefore, elements previously introduced in FIG. 5 are numbered the same and not re-introduced in FIG. 6.

In the depicted example, following from FIG. 5, a spark ignition event 501 in Cylinder 1 occurs with spark retard such that the ignition event is delayed later into the power stroke. As a result of the late combustion event, a large amount of hot exhaust residuals are discharged from Cylinder 1 during the exhaust stroke (plot 502) into Cylinder_2 and the forced entry of hot exhaust residuals is detected via signature engine block vibrations that arise due to ringing of the exhaust valve of Cylinder_2 in a window during an open exhaust valve of Cylinder_1. In response to the detection of forced exhaust residual entry into Cylinder_2 and to reduce the likelihood of pre-ignition in Cylinder 2, a rich fuel injection 602 may be performed during the intake stroke of Cylinder 2. The rich fuel injection enables a temperature of the exhaust residuals received in Cylinder 2 to be lowered, in situ, thereby also lowering a likelihood of pre-ignition in Cylinder 2. A degree of richness of the rich fuel injection may be adjusted based on the degree of lateness in combustion of Cylinder_1. In some embodiments, the rich fuel injection can include a higher proportion of direct injected fuel and a lower proportion of port injected fuel. Additionally, while the rich fuel injection is shown as a single injection in the intake stroke of Cylinder_2, in alternate embodiments, the rich fuel injection may be retarded into the compression stroke of Cylinder_2 and delivered as multiple compression stroke injections. An amount of injection timing retard and a number of compression stroke injections may be based on the degree of lateness of the combustion of Cylinder_1.

In some embodiments, where at least a portion of cylinder fuel injection is provided via direct injection, the temperature of the residuals may also be lowered by optionally performing a late rich fuel injection 604 in Cylinder 1 itself. For example, a controller may perform an initial (stoichiometric) fuel injection to Cylinder 1 in the intake stroke and in response to the combustion timing of combustion in Cylinder 1 being later than a threshold timing, the controller may perform a second rich fuel injection to Cylinder 1 in the exhaust stroke. This provides multiple advantages. First, it allows the temperature of the residuals being released from Cylinder 1 to be lowered, in situ. In addition, it provides at least a portion of the pre-ignition mitigating rich fuel injection, required for Cylinder 2, in advance. Consequently, a rich fuel injection having a smaller degree of richness may need to be delivered to Cylinder 2. In one example, the controller may determine a pre-ignition mitigating rich fuel injection amount to be injected into Cylinder 2 responsive to the late combustion event in Cylinder 1, and may deliver a first (e.g., smaller) portion of the total fuel injection amount during the exhaust stroke of Cylinder 1 while delivering a second (e.g., larger) portion of the total fuel injection amount during the intake stroke of Cylinder 2. A split ratio of the first and second portions may be based on a degree of lateness of the late combustion event in Cylinder 1 (e.g., based on how late the combustion timing of Cylinder 1 is from a threshold timing).

In some embodiments, even though the temperature of residuals received in Cylinder 2 are lowered, the large amount of residuals received therein can raise the exhaust temperature of combustion when combustion occurs in Cylinder 2. As shown in map 600, since the exhaust valve timing of Cylinder 2 overlaps with the intake valve timing of Cylinder 4, exhaust residuals generated in Cylinder 2 may be most likely received in Cylinder 4. The elevated exhaust temperature of combustion in Cylinder 2 can then raise the likelihood of pre-ignition in Cylinder 4. In other words, the late combustion event in Cylinder 1 can indirectly affect, and raise the risk of pre-ignition, in Cylinder 4, even though Cylinder 4 does not receive exhaust residuals directly from Cylinder 1. To pre-empt this indirect risk of pre-ignition, following the late combustion event in Cylinder 1, in addition to the rich fuel injection 602 performed in Cylinder 2, another pre-emptive pre-ignition mitigating rich fuel injection 606 may be performed Cylinder 4. However, the degree of richness of rich fuel injection 606 may be lower than the degree of richness of rich fuel injection 602 (compare sizes of boxes 602 and 606).

In this way, by performing a pre-ignition mitigating fuel adjustment in a cylinder undergoing untimely exhaust valve popping, late burn induced cylinder pre-ignition events occurring due to the forced delivery of hot exhaust residuals into the cylinder can be reduced.

Figure 7:
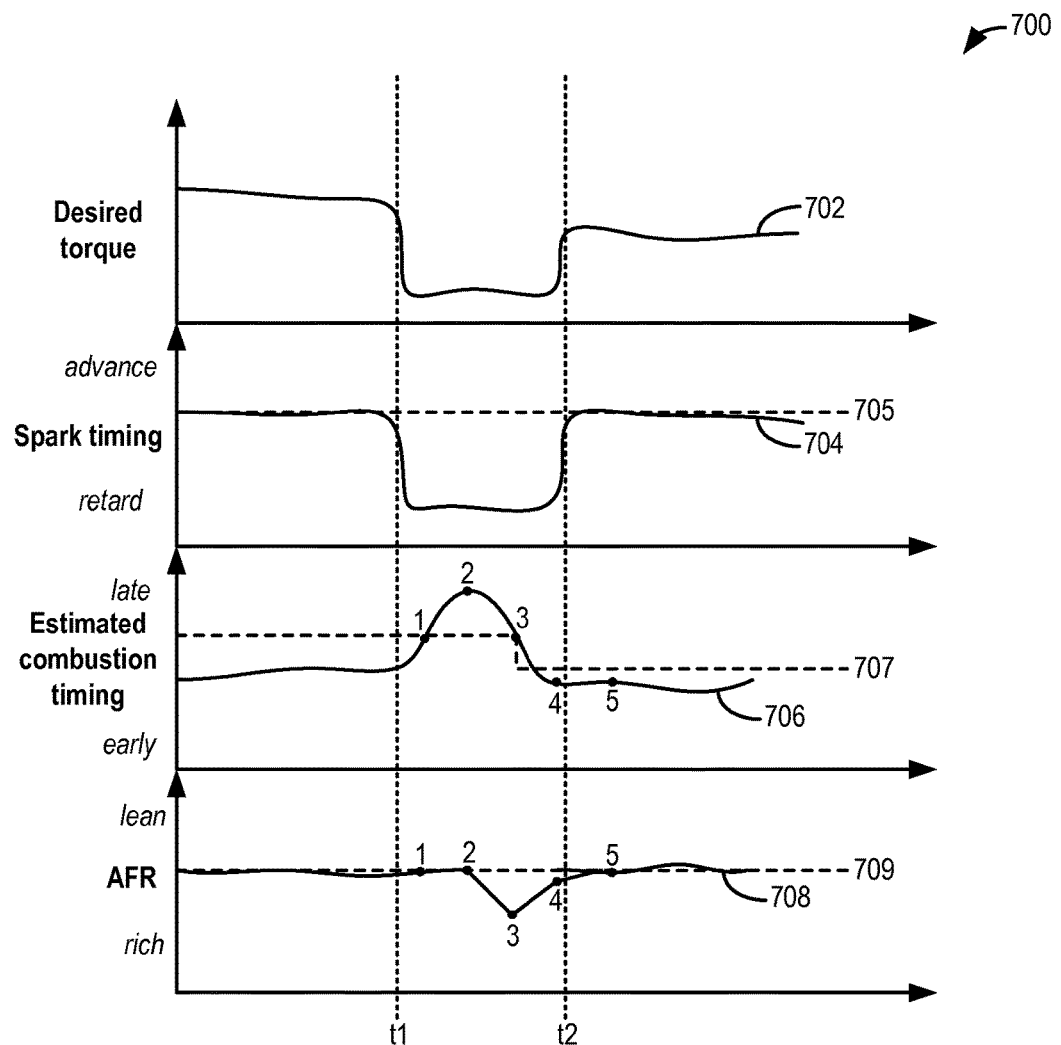

Now turning to FIG. 7, map 700 shows another example fuel adjustment in a neighboring cylinder responsive to a late combustion event in a given cylinder. In particular, map 700 shows an example engine operation wherein engine parameter settings are modified from nominal settings in response to a sudden drop in the desired torque demand. In the depicted example, the engine uses at least some spark timing retard to address the transient over-torque condition. In response to the resulting late combustion in a cylinder, fuel injection in a neighboring cylinder is modified (herein, enriched) to address potential pre-ignition arising from the entry of hot residuals into the neighboring cylinder. Specifically, map 700 depicts a change in desired torque at plot 702, a change in spark timing at plot 704, an estimated combustion timing (for each cylinder undergoing a combustion event) at plot 706, and a change in cylinder air-to-fuel ratio (AFR) due to a change in cylinder fuel injection at plot 708.

Before t1, the engine may be operating with nominal torque demand (plot 702) provided by maintaining engine parameter settings at nominal settings (plot 704). For example, based on an operator pedal position indication, the desired amount of torque may be provided by adjusting a boost level of an engine turbocharger, setting spark timing at MBT (or borderline spark settings), adjusting an engine speed (e.g., to idle speed), adjusting an EGR valve to provide a smaller amount of EGR, etc. At t1, a sudden drop in torque demand may occur as a result of which an over-torque condition is confirmed. The sudden drop in torque demand may be due to a transmission shift being requested, engine idle speed over-speed conditions, a transient change in requested EGR, a pedal tip-out, etc. To allow the torque produced to be rapidly lowered in order to meet the reduced torque demand, engine parameter settings may be modified from the nominal settings at which they were. For example, boost level may be lowered, EGR may be increased to increase engine dilution, intake and/or valve timings may be adjusted, and/or spark timing may be retarded (plot 704).

Based on the modified settings, a combustion timing may be estimated (plot 706) and compared to a threshold timing 707. As such, the threshold timing 707 may be adjusted based on the torque demand (plot 702). In the depicted example, following t1, an estimated combustion timing (plot 706) of a first combustion event in a first cylinder 1 (depicted as 1) may be performed at threshold timing 707 while operating the first cylinder with an air-to-fuel ratio (AFR) at or around stoichiometry 709 (see plot 708). A second combustion event in a second cylinder 2 (depicted as 2) may be performed while also operating the second cylinder with an air-to-fuel ratio (AFR) at or around stoichiometry 709 (see plot 708). However, the estimated combustion timing of combustion in the second cylinder 2 may, however, be performed later than threshold timing 707 due, at least in part, to the spark timing retard applied at t1. As a result, the estimated combustion timing of combustion in second cylinder 2 may be determined to be late. This may lead to a large amount of hot exhaust residuals being generated at second cylinder 2 and being received in third cylinder 3 (depicted as 3). The large amount of hot residuals may increase the likelihood of pre-ignition in third cylinder 3.

To pre-empt the pre-ignition in third cylinder 3, in response to the late combustion timing of combustion in second cylinder 2, fuel injection to third cylinder 3 may be enriched such that third cylinder 3 undergoes combustion at threshold timing 707 while operating with an air-to-fuel ratio that is richer than stoichiometry 709 (see plot 708). Optionally (as shown here), in addition to enriching third cylinder 3, a fourth cylinder 4 (depicted as 4), configured to receive exhaust residuals from third cylinder 3, is also enriched. However, the degree of richness of the rich fuel injection to fourth cylinder 4 is lower than the degree of richness of the rich fuel injection to third cylinder 3, as shown by the relatively less rich air-to-fuel ratio of combustion in fourth cylinder 4 as compared to third cylinder 3. As such, even if the hot residuals received in third cylinder 3 do not cause pre-ignition in third cylinder 3, they can raise exhaust temperature of combustion in cylinder 3. Since residuals from cylinder 3 are then received in cylinder 4, the elevated exhaust temperature of combustion in third cylinder 3 can raise the possibility of pre-ignition in fourth cylinder 4. Thus, by enriching fourth cylinder 4 is addition to third cylinder 3, albeit at a smaller degree of enrichment, the potential for late-burn induced pre-ignition (induced by the late burn event in second cylinder 2) in each of third cylinder 3 and fourth cylinder 4 can be reduced.

At t2, the transient drop in torque demand may end and torque demand may increase. Accordingly, engine operating parameters may be returned to nominal settings, including returning spark timing to MBT or borderline spark settings. As a result, a subsequent combustion event in the fifth cylinder 5 (depicted as 5) may be performed at an estimate combustion timing that is at or earlier than threshold timing 707, while operating fifth cylinder 5 with an air-to-fuel ratio that is substantially at stoichiometry 709 (see plot 708).

In this way, responsive to a late combustion event in a given cylinder, fuel injection to one or more neighboring cylinders, including at least one neighboring cylinder receiving exhaust residuals from the late combustion event in the given cylinder, may be adjusted to pre-empt late-burn induced pre-ignition events.

It will be appreciated that while the examples of FIGS. 6 and 7 illustrate pre-empting late-burn induced pre-ignition by performing a rich fuel injection, in alternate embodiments, a different pre-ignition mitigating operation may be performed in the cylinder(s) receiving exhaust residuals (directly or indirectly) from the late combusting cylinder. For example, in response to a late combustion event in a first cylinder, fuel injection to a second cylinder receiving exhaust residuals from the first cylinder may be deactivated. Optionally, fuel injection to a third cylinder receiving exhaust residuals from the second cylinder may also be deactivated.

In this way, by sensing engine block vibrations in a window during an open exhaust valve event of a late burning cylinder, vibrations caused due to forced entry of exhaust residuals into a neighboring cylinder can be better detected and distinguished from knock and pre-ignition events in other engine cylinders. By performing a cylinder pre-ignition mitigating action (e.g., cylinder fuel enrichment or selective fuel deactivation) in the cylinder receiving exhaust residuals from the late combusting cylinder, a temperature of the received exhaust residuals may be decreased and the propensity for late burn induced pre-ignition in the cylinder receiving the hot exhaust residuals may be lowered. In addition, the likelihood of pre-ignition being induced by the cylinder receiving the hot residuals in further cylinders is also reduced. Overall, engine degradation due to pre-ignition can be mitigated.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine method comprising:
delaying combustion timing in a first cylinder;
estimating a temperature of exhaust residuals released into an exhaust manifold following combustion in the first cylinder; and
performing a pre-ignition mitigating action in a second cylinder forcibly receiving exhaust residuals from the combustion in the first cylinder based on the estimated temperature of the exhaust residuals being higher than a threshold temperature.

2. The method of claim 1, wherein the second cylinder forcibly receives exhaust residuals via a forced opening of an exhaust valve of the second cylinder, the method further comprising detecting the second cylinder forcibly receiving exhaust residuals from the combustion in the first cylinder.

3. The method of claim 2, wherein the detecting includes sensing engine block vibrations in a first window during an open exhaust valve event of the first cylinder, and wherein the performing includes performing a pre-ignition mitigating action in the second cylinder based on an amplitude of the sensed engine block vibrations at a first frequency range in the first window being higher than a first threshold.

4. The method of claim 3, further comprising:
sensing engine block vibrations in a second window during the open exhaust valve event, the second window earlier than the first window;
performing a pre-ignition mitigating action in a third cylinder firing immediately after the first cylinder based on an amplitude of the sensed block vibrations at a second, different frequency range in the second window being higher than a second threshold; and
performing a knock mitigating action in the third cylinder based on the amplitude of the sensed block vibrations at the second frequency range in the second window being lower than the second threshold.

5. The method of claim 4, wherein the first window is after a spark ignition event in the second cylinder and before a spark ignition event in the third cylinder, and wherein the second window partially overlaps the first window.

6. The method of claim 5, wherein the pre-ignition mitigating action in the second cylinder is performed for a first, smaller number of combustion events, and wherein the knock mitigating action in the third cylinder is performed for a second, larger number of combustion events.

7. The method of claim 1, wherein the pre-ignition mitigating action is performed before receiving an indication of pre-ignition in the second cylinder.

8. The method of claim 1, wherein the pre-ignition mitigating action includes selectively deactivating fuel injection to the second cylinder.

9. The method of claim 1, wherein the pre-ignition mitigating action includes selectively enriching the second cylinder, a degree of richness of the selectively enriching adjusted based on a difference between the estimated temperature of the exhaust residuals released into the exhaust manifold following combustion in the first cylinder and the threshold temperature, the degree of richness increased as the difference increases.

10. The method of claim 9, wherein the selectively enriching further includes retarding a timing of rich fuel injection to the second cylinder towards a compression stroke and delivering the fuel over multiple compression stroke injections, wherein the fuel injection timing retard and a number of compression stroke injections is based on the combustion timing delay in the first cylinder.

11. The method of claim 1, wherein the pre-ignition mitigating action includes increasing direct injection of a first fuel having a higher octane content while correspondingly decreasing port injection of a second fuel having a lower octane content into the second cylinder.

12. The method of claim 11, further comprising continuing the increased direct injection for a number of combustion events until the temperature of the exhaust residuals is lower than the threshold temperature.

13. The method of claim 1, further comprising identifying the second cylinder based on an identity of the first cylinder and one or more of a firing order of the engine and an exhaust manifold configuration.

14. An engine method, comprising:
in response to a delayed combustion timing in a first cylinder,
estimating an amount and temperature of exhaust residuals released into an exhaust manifold following combustion in the first cylinder; and
performing a pre-ignition mitigating action in a second cylinder receiving exhaust residuals from the exhaust manifold via a forced opening of an exhaust valve of the second cylinder based on the estimated amount and temperature of the exhaust residuals.

15. The method of claim 14, wherein the performing includes performing based on one or more of the estimated temperature being higher than a threshold temperature and the estimated amount being above a threshold amount.

16. The method of claim 15, wherein the performing further includes performing until the estimated temperature is lower than the threshold temperature.

17. The method of claim 15, wherein performing the pre-ignition mitigating action includes adjusting fuel injection to the second cylinder to be richer than stoichiometry, a degree of richness of the fuel injection adjusted based on one or more of a degree of lateness of the delayed combustion timing, an amount of the exhaust residuals relative to the threshold amount, and a temperature of the exhaust residuals relative to the threshold temperature.

18. The method of claim 17, wherein the engine includes selectively deactivatable cylinders, and wherein the degree of richness is further adjusted based on a number of deactivated cylinders.

19. The method of claim 14, wherein the delayed combustion timing in the first cylinder is inferred based on one or more of a valve timing, a spark timing, a spark plug ionization current, crankshaft acceleration, and cylinder pressure of the first cylinder.

20. The method of claim 14, wherein the engine includes different groups of cylinders on different banks, and wherein the first cylinder and the second cylinder are located on a common engine bank.

* * * * *